(12) United States Patent
Stapel et al.

(10) Patent No.: US 6,912,538 B2
(45) Date of Patent: Jun. 28, 2005

(54) SYSTEM AND METHOD FOR DYNAMIC GENERATION OF STRUCTURED DOCUMENTS

(76) Inventors: Kevin Stapel, 1760 California Ave., Suite 201, Corona, CA (US) 92881; Ed Gormsen, 1760 California Ave., Suite 201, Corona, CA (US) 92881

( * ) Notice: Subject to any disclaimer, the term of this patent is extended or adjusted under 35 U.S.C. 154(b) by 557 days.

(21) Appl. No.: 10/032,223

(22) Filed: Oct. 19, 2001

(65) Prior Publication Data

US 2002/0087571 A1 Jul. 4, 2002

Related U.S. Application Data

(60) Provisional application No. 60/242,266, filed on Oct. 20, 2000.

(51) Int. Cl.[7] .............................................. G06F 17/00
(52) U.S. Cl. ..................... 707/101; 707/102; 715/513
(58) Field of Search ................................ 707/100, 102, 707/101, 104.1; 715/501.1, 513, 900

(56) References Cited

U.S. PATENT DOCUMENTS 5,970,490 A * 10/1999 Morgenstern ................ 707/10
6,629,097 B1 * 9/2003 Keith ............................. 707/5
2002/0091677 A1 * 7/2002 Sridhar ......................... 707/2

OTHER PUBLICATIONS

Quint et al "Combining hypertext and structured documents in Grif", ACM 1992, pp. 23–32.*

* cited by examiner

*Primary Examiner*—Uyen Le
(74) *Attorney, Agent, or Firm*—Knobbe, Martens, Olson & Bear, LLP

(57) ABSTRACT

A method and apparatus for representing complex data schemas and generating type validated output documents in a markup language. The methods apply to transforming document type definitions into extensible markup language coded information that can readily accommodate logical constraints imposed by recursion or repetition within the DTD structure. Furthermore, non-determinism arising from repetition or recursion in a data schema is resolved by traversal path coding using a matrix representation of the data schema.

58 Claims, 15 Drawing Sheets

SYSTEM AND METHOD FOR DYNAMIC GENERATION OF STRUCTURED DOCUMENTS

CLAIM OF PRIORITY

This U.S. patent application claims priority to U.S. Provisional Patent Application No. 60/242,266, entitled "Method and apparatus for dynamic generation of structured documents and corresponding database representation using matrix mathematical definitions and programmatic mapping" filed Oct. 20, 2000 which is hereby incorporated by reference.

BACKGROUND OF THE INVENTION

1. Field of the Invention

The invention relates to the field of data representation and, more particularly to a system and methods for generating data representations in a standard markup language using matrix definitions and programmatic mapping.

2. Description of the Related Art

The design and use of structured documents has become an important aspect to the development of mechanisms for distributing data and information in a rapid and reliable manner. Structured documents are commonly used for the storage and transmission of information over the Internet and the World Wide Web (WWW). Most documents on the Web utilize a form of a generalized markup language that is universally recognized and is well-suited for numerous data formats including: text, hypertext, multimedia, and the like.

Recently, the design specifications for markup languages have developed to contain numerous sophisticated features that make it possible to define custom formats for documents that represent complex information structures that may be used in the management of large information repositories. The Extensible Markup Language (XML) specification is one such markup language that is commonly used in the formation of structured documents for both simple and complex data representations. Originally designed to accommodate the needs of web development, this language specification has become widely used in numerous other areas as well. Of the many reasons that XML has become so widely accepted is its mechanisms for controlling the structure and content of documents, as well as, standardizing document linking and display functions.

XML is a derivative language from Structured Graphics Markup Language (SGML) and permits the definition of custom data representations, similar to database representations, within each document developed using the language. These document representations or structures are called Document Type Definitions (DTDs). DTDs are commonly associated with one or more structured documents known as stylesheets which define visual representations of the DTD and are used in organizing and presenting the information contained in the DTD. Stylesheets may be adapted to display information using numerous approaches including web-browsers, printers, handheld computers, or other electronic devices.

Unlike less sophisticated markup languages such as Hypertext Markup Language (HTML) where it is possible to create documents with many embedded errors, XML data structures and documents are desirably validated to insure consistency. Type-validation of the contents of an XML document and the associated DTD can be a complex and time consuming task. DTD validation defines the legal building blocks of an XML document and document structure using a list of legal elements. Type-validation insures that the structured document conforms to the open standards set by the World Wide Web Consortium (W3C). This means all data definitions conform to a specific syntax outlined by the W3C standard.

Conventional approaches to type validation map DTDs and the associated XML information into standard hierarchical data structures (or tree structures). These approaches create a problem in that the use of hierarchical data structures for XML mapping results in the limitation of the data schema based on the constraints of the hierarchical representation of the data. As a result, hierarchical data representation limits flexibility in the definition of the DTDs and inhibits the efficient formation of DTDs with significant complexity. One particular problem associated with conventional parsing and mapping techniques which use hierarchical data structures is that they fail to provide sufficient flexibility to permit the incorporation of recursive and repetitive data structures within the data schema of the DTD. As a result, conventional DTD definition is limited with respect to these characteristics which further limits the ability to generate structured documents.

Conventional methods used to construct relational data structures for elements of a DTD typically use numerous tables containing fields to store information (attributes) about each element in a data set. Relationships between elements are defined by key references (primary and foreign) which are further stored in fields within the tables for each element. A problem with this method of data organization is that it leads to highly complex data structures that contain many tables and references between tables. As the size of the DTD to be represented in the relational structure increases, a difficulty arises in maintaining a coherent data schema. Furthermore, as DTD complexity increases, a problem arises in validating the data schema and insuring that all of the relationships defined in the data schema are appropriately defined in each table for all required elements. Invalid or missing relationships within the data schema can lead to improper DTD representation and subsequent corruption of the data stored in the data structure representing the DTD. Furthermore, certain relationships such as recursion and replication are not efficiently supported using conventional data representations which lack the ability to easily define these relationships without invalidating the data schema or adding undue complexity to the data representation.

Another limitation of conventional approaches is the focus on allowing only a hierarchical structure for XML and mapping this structure directly into a relational database. This hierarchical structure approach to mapping is insufficient to achieve complex DTD representations in XML of the type needed to provide functionality in many business settings. As a result, mapping a DTD structure into a relational database using a hierarchical table structure imposes limitations in the ability to create the DTD using W3C standards, which do not impose hierarchical limitations.

Accordingly, it is desirable to have XML DTD representations to be developed that have complex relationships between elements of the DTD without the limitations imposed by conventional approaches. Furthermore, it is desirable to have a system and method for generating structured documents that permits the use of repeating and recursive data structures within the DTD representation. Use of repeating and recursive data structures is important as it permits the formation of data representations that are not otherwise possible using hierarchical structures with standard markup language elements and allows these elements to be transformed into standard relational database tables.

SUMMARY OF THE INVENTION

The system and methods for dynamic generation of structured documents presented herein overcome the limitations of conventional mapping techniques used to represent elements contained in a Document Type Definition (DTD) and map or parse these elements into a corresponding database structure. Typically these elements are defined using a standard markup language such as Extensible Markup Language (XML) or wireless application protocol. Using a matrix representation method for defining and associating elements, DTD representations can be mapped into a corresponding database structure with a reduced database table configuration requirement. One of the distinguishing characteristics of the dynamic generation system is that it accounts for both the element itself, as well as, a path taken to the element which is traversed through a matrix representation. This manner of organization stores singular structure definitions for each element in a matrix representation to thereby reduce the complexity of type-validated DTDs and associated stylesheets. The resulting matrix representation conveniently maps elements from even highly-complex DTD representations to dynamically generate structured documents from the database representation.

Another feature of the system and methods presented herein is the ability to support unconventional definitions or relationships between elements. For example, a specific element can be designated to have more than one parent element without violating design rules for transformation into XML. Additionally, repeating and recursive structures can be conveniently defined and these structures can be readily resolved without compromising the logical or relational integrity between elements of the DTD. Furthermore, this system can be adapted for use in thin client driven applications to reduce dependence on locally installed (fat client) software otherwise required to obtain functionality of the system.

In one aspect, the invention comprises a system for structured document generation having a data structure input module, a transformation module, a data element input module, and a document generation module. The data structure input module receives a data structure having a defined arrangement comprising one or more data elements having identifying relationships that associate the data elements. The transformation module transforms the data structure into a matrix representation to thereby preserve the defined arrangement of the data structure wherein the matrix representation comprises an internally recognized organization of the data structure. The data element input module stores user specified information in the matrix representation of the data structure to thereby populate the data structure with information. Finally, the document generation module accesses the matrix representation to generate a structured document comprising a representation of the information stored in the data elements in a markup language.

In another aspect, the invention comprises a method for generating markup language data representations of a data schema containing a plurality of elements interrelated by one or more relationships. This method defines a matrix representation for the data schema wherein the matrix representation further defines the relationships interrelating the elements in such a manner so as to permit the elements to be deterministically interrelated. Subsequently the method maps the matrix representation of elements into a database structure and stores information in the elements of the matrix representation and accesses the information stored in matrix representation to output at least a portion of the information using a markup language wherein the format of the information is determined by the elements and relationships of the data schema and is represented by an output markup language.

In still another aspect, the invention comprises a method for representing relationships between elements in a data schema wherein the method identifies the elements and the relationships between the data elements of the data schema and applies a plurality of matrix transformation operations to encode the data schema and further stores the encoded data schema in a database having a fixed number of tables so as to confer independence from data schema complexity.

In yet another aspect, the invention comprises a method for coding a document type definition into a structured document by receiving the document type definition comprising information defined by a plurality of elements and relationships coded in a pre-arranged structure and mapping the pre-arranged structure of the document type definition into a coded representation comprising a singular mapping of each of the plurality of elements that preserves the relationships coded in the pre-arranged structure. Subsequently, the coded representation is stored in a database construct having a fixed table number that maintains the singular mapping of the plurality of elements and the associated relationships and the elements contained in the coded representation are populated with information. Finally, the structured document is generated by extracting the information contained coded representation stored in the database construct and outputting the information in a markup language.

In another embodiment, the invention comprises a method for structured document generation that receives a data structure comprising one or more data elements having identifying relationships that associate the data elements and transforms the data structure into a matrix representation comprising an internally recognized organization of the data structure. The data elements of the data structure are transformed into the matrix representation and then populated with information. The information in the matrix representation is subsequently accessed to generate a structured document comprising a representation of the information in a markup language.

In still another embodiment, the invention comprises a system for structured document generation comprising an input module which receives a data structure comprising one or more data elements having identifying relationships that associate the data elements, a transformation module which transforms the data structure into a matrix representation wherein the matrix representation comprises an internally recognized organization of the data structure, a data element input module which populates the matrix representation with information, and a document generation module which accesses the information of the matrix representation to generate a structured document comprising a representation of the information in a markup language.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals in which.

DETAILED DESCRIPTION OF THE PREFERRED EMBODIMENT

Figure 1:
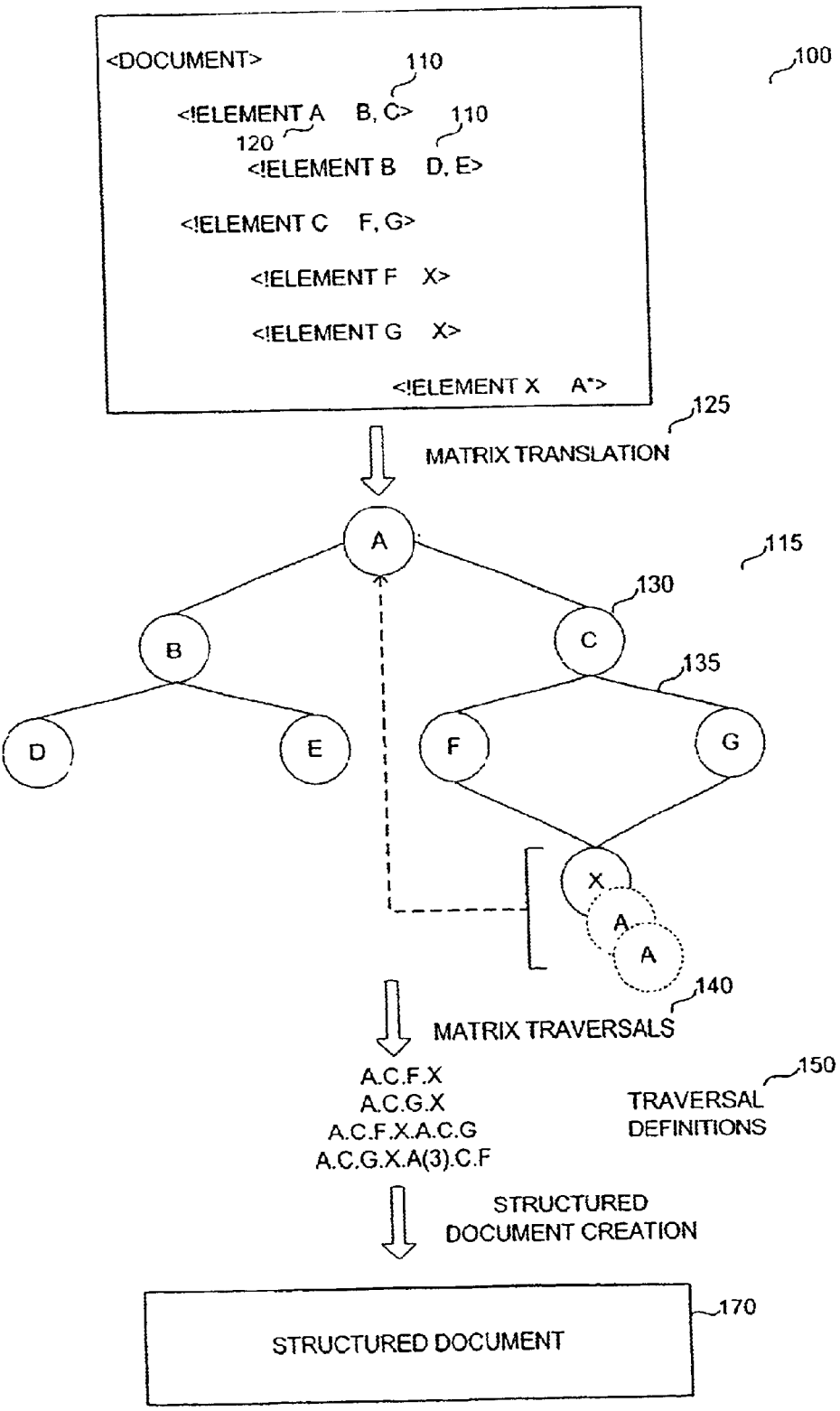
FIG. 1 illustrates one embodiment of a document type definition.

FIG. 1 illustrates an exemplary Document Type Definition (DTD) 100 comprising a plurality of data relationships between data elements 110 and an associated data schema depicting the relationships using a data matrix or matrix representation 115. The DTD 100 identifies, organizes, and associates the one or more data elements 110 in a meaningful manner. The format of the DTD 100 may follow standard conventions for element identification, such as the use of tags and/or identifying characters that define each element and its relationships. In the illustrated embodiment the element identification scheme follows conventional style guidelines set forth in basic the XML specification. It will be appreciated however, that other element identification schemes and style guidelines can be adapted to operate with the matrix mapping system such as those from any conventional programming technique. Style guidelines may additionally be formed that do not formally adhere to any conventionally accepted standard.

In the illustrated embodiment shown in FIG. 1 the elements 110, are represented by the alphanumeric characters "A", "B", "C", "D", "E", "F", "G", and "X" with a tag "!ELEMENT" defining an instance of the element 110. Each element 110 may be further relationally associated with other elements indicating that a given element may contain information derived from the other elements or be related to that element in other manners. In one aspect, relationships between elements in the DTD 100 define hierarchical orderings or dependencies between the elements 110. As an example, the elemental definition and association:

<!ELEMENT A B, C> defines an element "A" and associates this element with two other elements "B" and "C".

It will be appreciated that each element 110 may desirably represent any of numerous types of data representations including, for example, textual information, numerical information, variables, identifiers, filenames, formulas, character data, pointers, among other possible representations. Furthermore, the DTD 100 shown represents a simplified example of a typical DTD and does not depict other tags and formatting characters which may be present in the DTD defined by conventional stylistic guidelines.

In one aspect, the DTD 100 organizes the data elements 110 by identifying relationships using nested tags to define a tree-like structure hierarchy having a root element 120. The root element 120 forms the basis for subsequent relationships between data elements 110 that are linked to the root element 120 through the data schema. In the illustrated embodiment, the root element "A" is associated with two child elements "B" and "C". The child element "B" is likewise associated with still other child elements "D" and "E". The child element "C" is further associated with other child elements "F" and "G". The DTD 100 and associated data relationships defined therein are translated 125 into the matrix representation 115 where nodes 130 representing individual elements 110 are linked by edges 135 defining relationships between the nodes 130. It will be appreciated by one of skill in the at that the DTD 100 shown in FIG. 1 is but one example of a DTD representation. It is conceived that the system and methods described herein will operate with other DTD constructions. For example, these DTD constructions may be simple or complex and arranged in a hierarchical or non-hierarchical manner. Additionally, the DTD construction may be dynamically generated "on the fly" without the requirement of submitting a complete DTD to the system for processing. In one embodiment, the system for structured document creation incorporates a user interface to allow DTD definition, editing, and updating. Aspects of the DTD definition process will be described in greater detail hereinbelow.

Using conventional approaches to resolving XML relationships, a problem is encountered when a non-deterministic relationship is created for a particular data element. In one aspect, the non-determinism arises from the presence of alternative paths that can be used to reach a particular element in the data schema. For example, the associations relating to the element "X" in the matrix representation 115 indicate that this element is a child element to both elements "F" and "G". In conventional systems relationships of this type are unacceptable and present the problem of being unable to uniquely assign data to the element "X" because it can be arrived at from more than one path. The methods for defining the structured document presented herein overcome this problem and enable different values to be assigned to the element "X" depending on the path taken to reach the element.

Additionally, conventional methods may attempt to solve this problem by giving "X" a unique name for each path (such as "X1", "X2" etc.) which returns the structure to a true hierarchical tree. This solution however is inefficient because many more definitions of the same data item "X" may be required. The present invention need only define "X" once. Using the methods presented herein, an internal representation of W3C standard XPATH data descriptions may be performed. In one aspect, this manner of data representation improves the efficiency for storing and manipulating data in XML format.

As will be described in greater detail hereinbelow, a matrix traversal method enables different values to be assigned to the element "X" depending upon the path that is traversed to reach the element. For example, to reach the element "X" from the root node "A", two paths can be identified. In a first path, the elements in the data matrix 115 are traversed in the order of A→C→F→X. In a second path the elements in the data matrix 115 are traversed in the order of A→C→G→X. Differences in traversal 140 of the matrix representation 115 can be maintained using specialized notation that indicates the order of traversal. In one aspect, dot notation is desirably used to indicate the traversal order such that the first path is indicated by A. C. F. X and the second path is indicated by A. C. G. X.

In addition to providing the aforementioned distinguishing matrix traversal paths, the matrix representation 115 also accommodate recursion within the data schema. The recursive aspects of matrix traversal are shown in the DTD 100, by the association:

<!Element X A*>

This association defines a reference from the element "X" back to the original root element "A". The "*" is DTD notation meaning "A" can occur 0 or more times under the element "X". Ordinarily, introduction of such a relationship in a DTD may be valid, but is prohibitive when using conventional methods as it introduces a loop or recursive relationship into the data schema. Loop or recursive relationships in the data schemas used by conventional methods present a problem in that they cannot be resolved in a deterministic manner. The matrix representation 115 accommodates the presence of these relationships which can be notated as before to indicate the order and degree of traversal. In the present invention, since "A" can be defined to occur 0 times under "X", the recursion may be ended when "A" does not occur in that position. For example, the path defined by the sequence A. C. F. X. A. C. G defines a traversal path that proceeds once through the matrix representation 115 and upon a second traversal, through the first occurrence of "A" under "X" of the matrix representation 115 arrives at element "G". Thus, complex traversal paths can be defined that incorporate both recursive relationships, as well as, non-deterministic (repetitive) associations for each data element 110.

Additional flexibility in the matrix traversal operations 140 is accomplished by supporting repeating (as described above for "A"), as well as recursive matrix traversals through the use of subscripting in the traversal definition 150. Subscripting in the traversal definition 150 defines values that represent a desired repetitive iteration of the element "A". For example, the matrix definition A. C. G. X. A(3).C.F defines a recursive traversal 150 of the data schema through the third iteration of "A" under "X" on through C and subsequently proceeding to reach element "F". The equivalent W3C XPATH notation would be "A\C\G\X\A[3]\C\F". It will be appreciated that the use of the repeating subscript notation increases the flexibility in document definition and permits element repetition as well as recursive traversal without endless loop formation. It will also be appreciated that XPATH conformance is maintained at all levels of the structure.

The aforementioned methodology for defining matrix definitions 150 results in the ability to represent virtually any DTD 100 and transform the DTD representation into a relational model that may be subsequently used to form structured documents 170 using a standard markup language such as XML. In one aspect, this method also facilitates the mapping of the structured document into a relational database by means of recursive keys. As will be described in greater detail hereinbelow, this feature allows for efficient storage and retrieval of information in a secure manner, while reducing disk space requirements needed to store the data schema and reducing system overhead in storing, retrieving, and maintaining information in the data schema.

Figure 2:
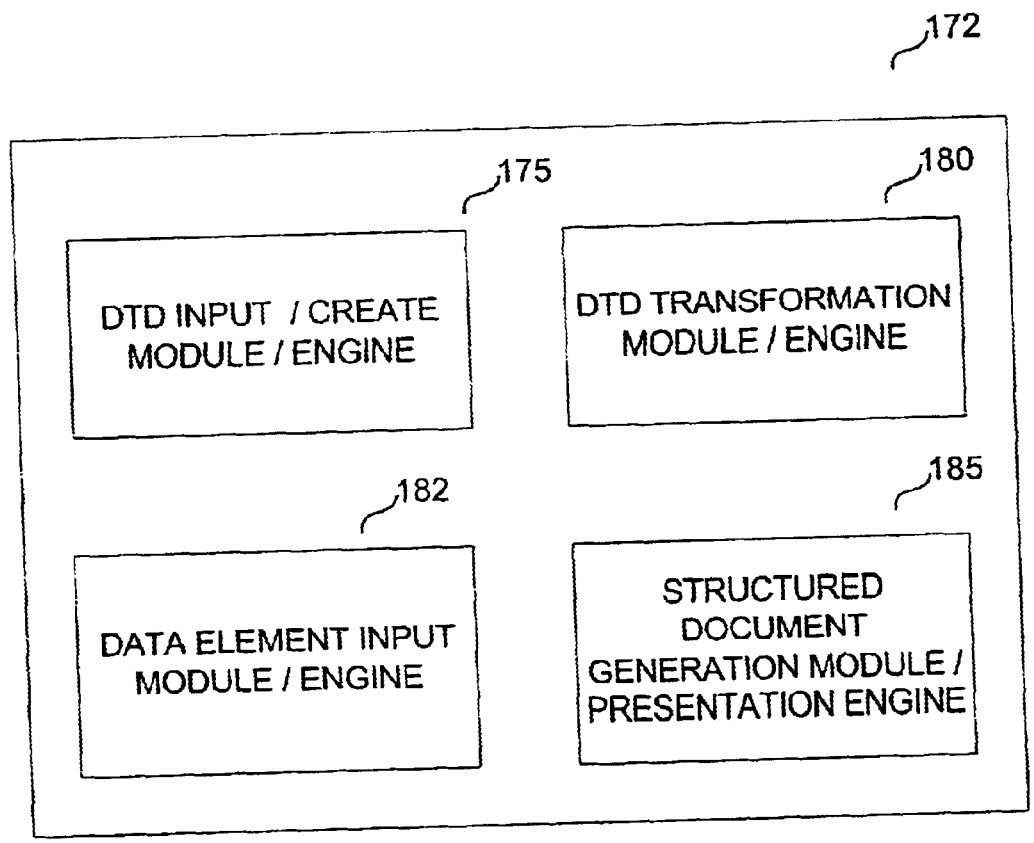
FIG. 2 illustrates one embodiment of a system for dynamically generating structured documents using matrix representations.

FIG. 2 illustrates a system 172 for dynamically generating structured documents 170 using matrix representations 115. The system 172 comprises a plurality of modules that interact with one another to receive and create DTD's, create documents against those DTD's, insert, delete and update data within the documents and retrieve documents with their associated DTD's. In one aspect the output documents created by the system 172 are presented in W3C standard format. The modules of the system 172 include a DTD input and create module 175, a DTD transformation module 180, a data element input module 182 and a structured document generation and presentation module 185. In one aspect, these modules 175, 180, 182, 185 represent software components that may be integrated into a wide variety of applications and hardware configurations designed to receive and process structured documents. In one exemplary application, the modules 175, 180, 182, 185 are integrated into a thin client architecture that generates structured documents 170 via DTD input received through a web browser interface which is processed by the DTD input and create module 175. Using this thin client package, the software components necessary for producing the structured document 170 from a DTD representation reside on a server computer that is desirably accessible to one or more client computers through a networking connection. One advantage of the abovementioned thin client architecture is that the client computers need not contain any specialized software for generating the structured document 170. Instead conventional web browsers may be used to interact with the structured document generation system. Furthermore, the DTD may be manually input or defined in a "live" manner without the use of a pre-existing input file. It will be appreciated by those of skill in the art that the thin client implementation of the system provides a number of advantageous features. Some of the beneficial features of the thin client system include facilitated user interaction through the use of a common and familiar interface, reduced maintenance and upgrade requirements, and increased accessibility and portability compared to conventional fat client architectures. In a fat client architecture, the structured document generation system is designed as a standalone application that is installed locally on each computer that will be used to produce structured documents. While the structured document generation system can be readily integrated into such an architecture, the thin client approach is typically more appropriate in instances where the application will be in use by large numbers of users.

The structured document generation system 172 is configured to receive user-defined DTDs 100 using the DTD input and create module 175. This module 175 can be desirably configured to accept a wide variety of input DTD formats and the format of the DTD need not adhere to any conventional standard. In one aspect, the format of the DTD maintains compliance with standards set forth by W3C XML specifications. In one embodiment, the DTD 100 is represented in a manner similar to that presented in FIG. 1 where a plurality of elements are defined using keywords, identifiers, and tags. The structure and format of the DTD 100 defines various relationships between the elements 110 of the DTD 100 and the system 172 resolves these relationships to create the matrix representation 115. As previously indicated, the DTD may be predefined in a file format which is received by the DTD input and create module 175 or alternatively the DTD 100 may be input in a "live" manner via a user interface into the system 172. The user interface desirably provides functionality for allowing the user to define a DTD 100 in an environment where the user can edit and visualize the DTD 100 as it is being built.

In one aspect, the DTD input module 175 receives the DTD 100 and verifies the DTD structural validity. During this time, the DTD input and create module 175 recognizes and identifies the appropriate use of keywords, identifiers, and tags to verify that the structure of the DTD 100 meets syntactic and stylistic requirements imposed by the system 172. Should the DTD 100 fail to meet these requirements the input module 175 may attempt to convert the DTD 100 into a structurally valid representation or, if unable to process the input DTD 100, output an error or notification signal indicating that the DTD 100 does not meet structural constraints imposed by the system.

When the DTD structural validity has been verified, the transformation module 180 performs a series of operations that transform the input DTD 100 into the matrix representation 115. As previously indicated, the matrix representation 115 is an internally recognized data schema that defines the elements 110 and relationships provided by the DTD 100. As will be described in greater detail hereinbelow, the transformation 180 represents the elements 110 and relationships of the DTD 100 in a matrix structure defined by a consolidated table set.

In one aspect, the DTD transformation 180 overcomes the limitations of conventional systems by creating a data schema that is represented by a consolidated table set wherein all elements and relationships in any DTD can be represented in a fixed table number. Use of a fixed table number aids in maintaining consistency in the data relationships, avoids increased data schema complexity resulting from the use of many tables, and provides a mechanism to define and resolve recursive and replicated relationships in a convenient and reliable manner. The use of a fixed table number additionally simplifies administration requirements for maintaining the matrix representation and data contained therein.

Upon conversion of the DTD 100 into a series of elements represented by the matrix representation 115 and defined by the consolidated table set, the elements of the DTD representation are populated with data using the data element input module 182. This module 182 receives user input, for example in the form of a defined file of data or via direct user input to store information to be desirably represented within the DTD 100. The structured document generation and presentation module 185 subsequently accesses the stored information to generate documents in a markup language such as W3C standard XML format. The XML document can then be translated, as the user sees fit, via standard transformation languages such as XSL Transformations (XSLT) to produce output in any number of different formats. The generation and presentation module 185 recognizes the relationships defined in the consolidated table set and furthermore utilizes specialized matrix traversal operations, such as those defined by example in FIG. 1A to access and present stored data contained in the matrix representation. In one aspect, the matrix traversal operations facilitate the resolution of recursive and repetitive data structures and preserve the syntactic and logical integrity of structured documents created by the system 172. In one aspect, the structured document generation and presentation module 185 comprises functionality for producing output structured documents that are stored and retrieved in the form of a file. Alternatively, the module 185 may generate structured documents that are directly output to a display screen or printer for use by the user.

Figure 3:
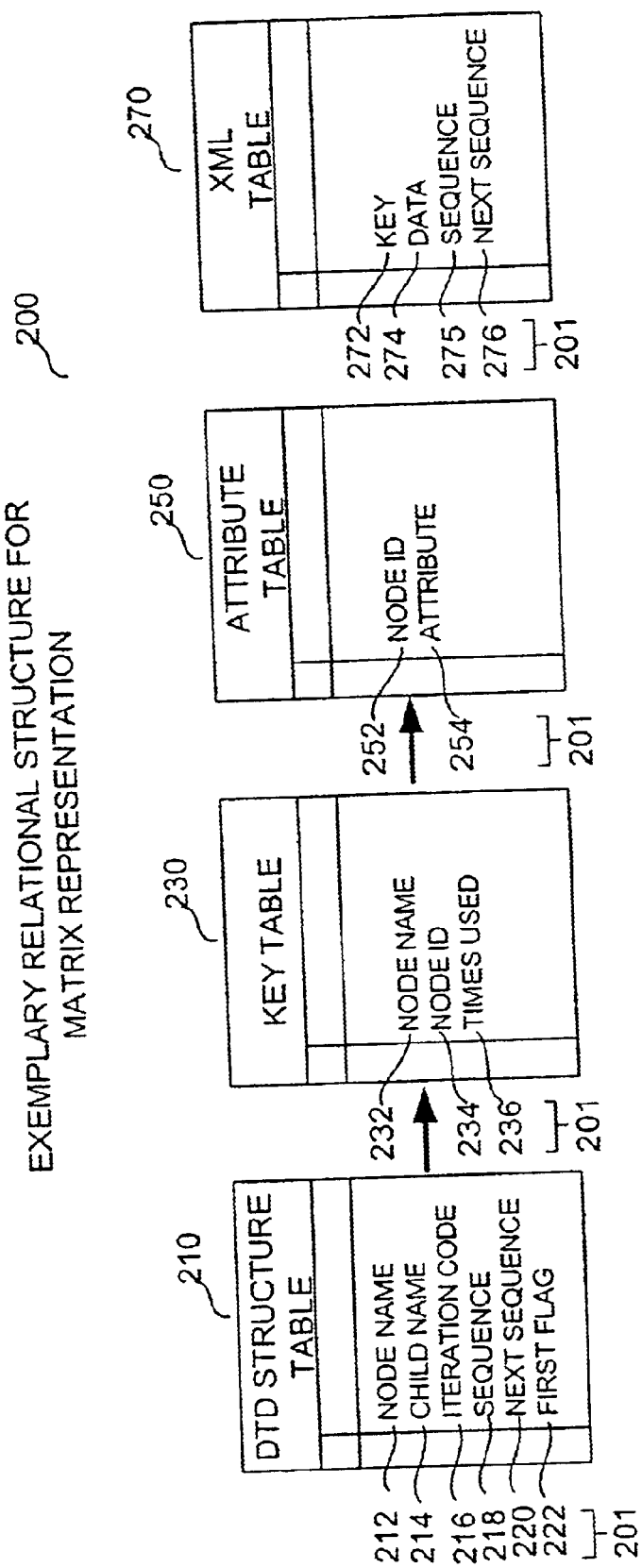
FIG. 3 illustrates one embodiment of a matrix table set.

FIG. 3 illustrates a consolidated table set 200 that may be used to define DTDs 100 of substantial complexity in a simplified manner. In one aspect, the consolidated table set 200 defines a plurality of relational tables that store information about the elements and relationships defined by the DTD 100. The relational tables comprise a DTD structure table 210, a DTD key table 230, an DTD attribute table 250, and a node naming table or XML table 270.

The DTD structure table 210 comprises a plurality of fields 201 that define the characteristics of the matrix representation 115 of the DTD 100. The characteristics of the matrix representation 115 include a node name 212, a child name 214, an iteration code 216, a sequence code 218, a next sequence code 220, and a first flag identifier 222. The structured document generation system 172 identifies the matrix representation 115 of the DTD 100, and for each element, populates the appropriate fields of the DTD structure table 210. Likewise, the DTD key table 230 comprises a plurality of fields 201 that further define characteristics of the matrix representation 115 and include a node name 232, a node ID 234, and a times used identifier 236. The DTD attribute table 250 comprises a Node ID field 252 and an attribute field 254. Finally, the XML table 270 comprise a key identifier 272, a data identifier 274, a sequence code 275 and a next sequence 276.

Each of the above mentioned tables is utilized in conjunction with one another to fully describe each of the elements and relationships designated in the matrix representation 115 of the DTD 100. In one aspect, the structure table 210, the key table 230, and the attribute table 250 are interrelated by fields whose definitions correspond between two of more tables. For example, the key table 230 and the attribute table 250 can be interrelated by the use of the identical field identifier; node name 212, 232. Similarly, the key table 230 and the attribute table 250 can be interrelated by the use of the identical field identifier; node ID 234, 252. Also, the child name 214 is related to the node name 212 as a foreign key from the structure table 210, back to itself, allowing for recursive traversal of the DTD structure. The XML table 270 contains the traversal definitions 150 and the associated data required for the path definition. Thus, information contained in each table 210, 230, 250 can be readily associated and related to specific nodes of the matrix representation 115 through the use of interrelated field identifiers. Furthermore, each node in the matrix representation 115 is uniquely defined by one or more of the identifiers such as node name 212 and node id 234 to associate information contained in the tables 210, 230, 250 with the various nodes of the matrix representation 115.

In one aspect, each table 210, 230, 250 is variably sized and grows and contracts as needed to accommodate DTDs of different sizes and complexities. Thus, highly complex DTDs can be represented with the same table complexity as more simplistic DTDs. This method of organizing data and relationships, is beneficial in that it facilitates maintaining data schema integrity and reduces that likelihood that the data schema will be invalidated by improper or inappropriate data associations which often result as a result of attempts to transform highly complex DTDs into data schemas with many tables.

In conventional methods the data relationships depicted in FIG. 1, such as node, "X" being accessible (owned) by more the one other node, "F" and "G", may only be accomplished by giving the owned node a unique name for each path, such as "X1", "X2" etc. This limitation of conventional systems returns the structure to a true hierarchical tree and is inefficient because many more definitions of the same data item "X" may be required thus increasing the complexity of the tree structure. In the present invention, an mutually owned node such as shown for "X" in FIG. 1 need only be defined once. This results in a simplified data structure and increases the flexibility of developing complex DTD representations.

Figure 4:
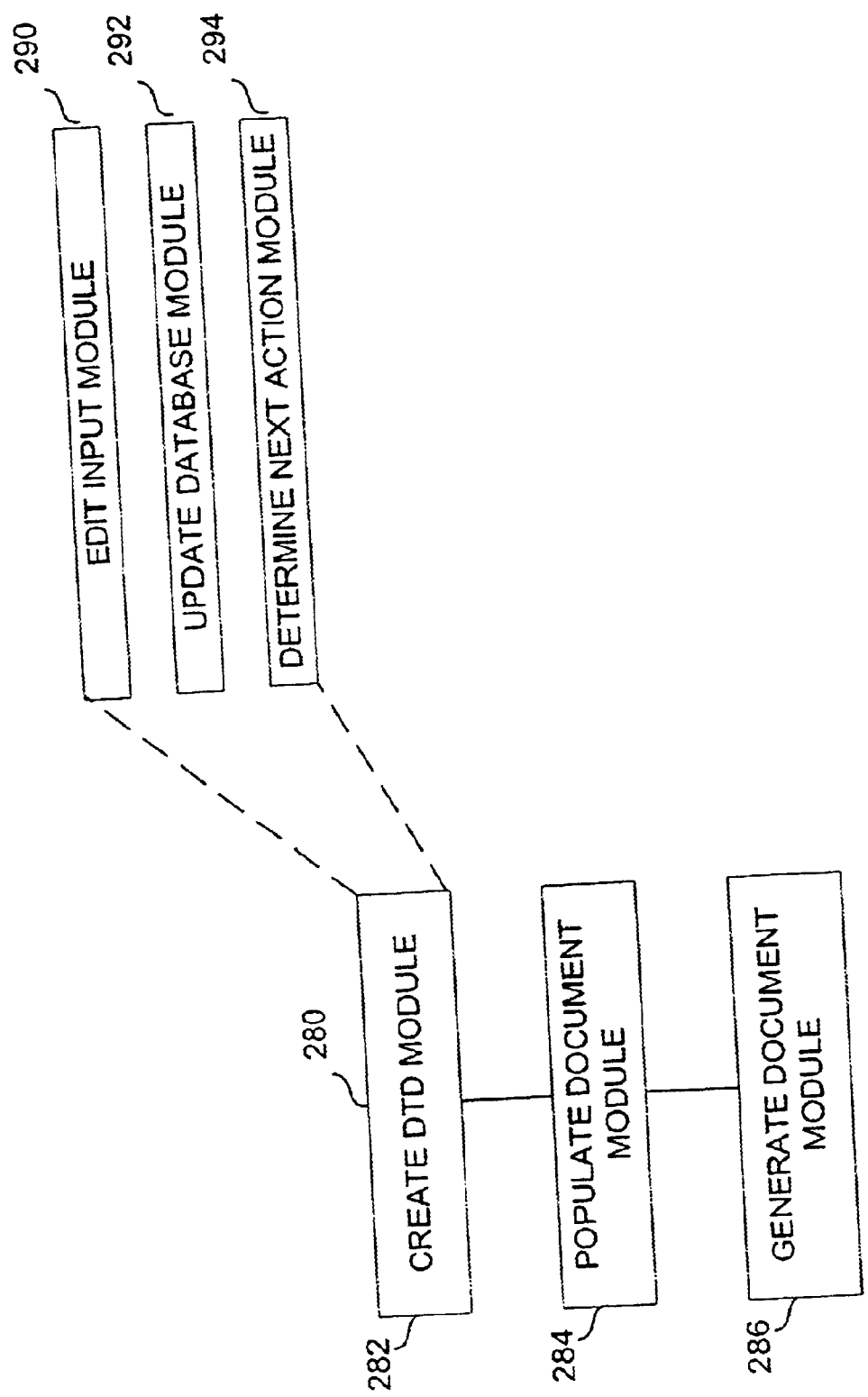
FIG. 4 illustrates one embodiment of modules that provide structured document generation functionality.

FIG. 4 is a schematic illustration of system modules that provide functionality for structured document generation. These modules include: (1) a create DTD module 282 for the data schema recognition, (2) a populate DTD module 284 which processes information representative of data to be desirably represented by the DTD, and (3) a generate structured document module 286 that presents the information represented by the DTD in a desired format. These modules 282, 284, 286 interact using various matrix operation methods as described below to accomplish necessary processing and manipulation of the matrix representation 115 and associated data.

The Create DTD module 282 further comprises a plurality of submodules including an edit input module 290, an update database module 292, and a determine next action module 294. The Create DTD module 280 implements the matrix representation 115 using the edit input module 290 where entries in the consolidated matrix tables 200 are populated based on input information. Information relating to each node of the matrix representation 115 is desirably input into the system 172 in an organized manner wherein the consolidated matrix tables 200 store the information for each node of the matrix representation 115 and further associate one or more relations with other nodes of the matrix representation 115. The nodes are input into the matrix tables 200 as a series of submissions or entries where the edit input module 290 extracts relevant information from the DTD 100 and the update database module 294 stores the extracted information in a database which represents the matrix tables 200. In one aspect, the first submission or entry is considered the name and/or the "root" of the "matrix" (corresponding to element "A" in the matrix representation 115 in FIG. 1). This designation of the root node as first submission that is used to populate the matrix tables 200 serves as a reference point for subsequent document population and retrieval by the system 172. During rendering of the DTD, the edit input module 290 identifies information and attributes including those to be associated with fields comprising the node names 212, child names 214, iteration codes 216, and node ID codes 234 that are identified within the DTD 100 and their values passed to the appropriate fields 201 of the matrix tables 200 define the schema of the matrix representation 115. This information is subsequently used by the update database module 292 to populate the matrix tables 200 and to store the information of the matrix representation 115 in the appropriate fields 201 of the matrix tables 200. In one aspect, each value that is stored in the table 200 is checked for validity using a plurality of pre-defined DTD rules. Validity may be established by identifying a desirable syntax or structure of the input DTD 100. The syntactic or structural requirements of the DTD 100 may further be validated using definitions, guidelines, and rules specified by the world wide web consortium (W3C).

Figure 5:
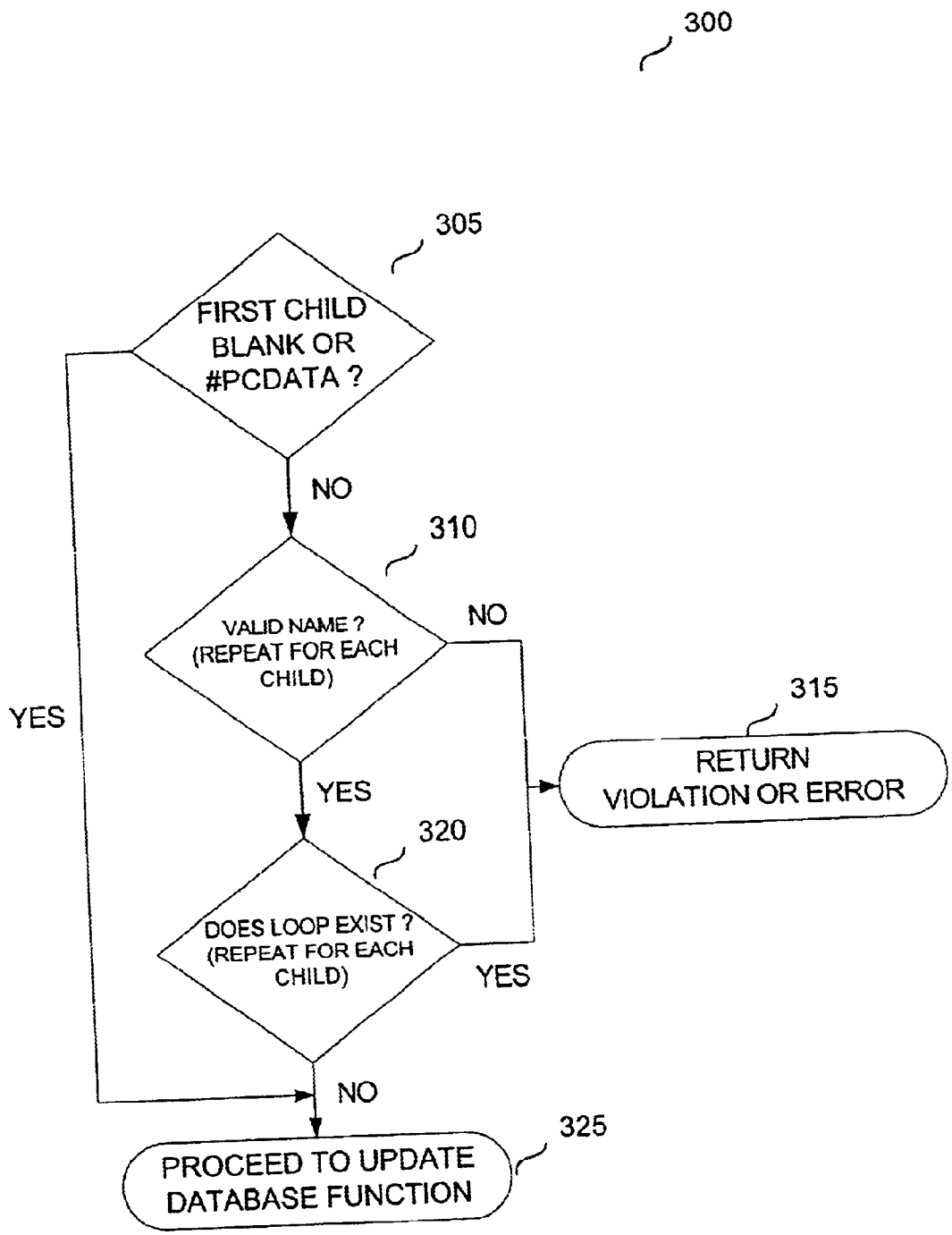
FIG. 5 illustrates one embodiment of a method for validity determination in matrix representation.

FIG. 5 illustrates a process 300 by which each node in the matrix representation 115 is checked for validity. Each node corresponds to a separate element in the DTD 100 whose attributes and relationships are stored in the matrix tables 200 by the create DTD module 282 in the manner described in conjunction with FIG. 4. In one aspect, the DTD 100 is defined and encoded by validating the contents and relationships for each node in the matrix representation 115 as they are stored in the matrix tables 200.

The edit input module 290 verifies the logical construction of the DTD 100 using the validation process 300 shown in FIG. 5. The validation process 300 is executed for each node in the matrix representation 115 commencing with the root node. The validation process 300 identifies DTD structures that violate rules of logical construction that would prevent the DTD 100 from being converted into the matrix representation 115. Using the validation process 300 in this manner insures that the resulting matrix representation 115 that is defined in the matrix tables 200 will accurately reflect the elements and logical associations described by the DTD 100.

The validation process 300 commences by receiving information comprising the node, child nodes, associated iteration codes, and attributes of the matrix representation 115 to be validated. The process 300 then proceeds to make a determination 305 as to whether or not a first child exists in the matrix representation 115 for the root node. If the root node is determined to not contain any children, the process 300 proceeds to a terminal state 325 where control is passed to the update database module 292. Additionally, the process 300 may proceed to the termination state 325 if the first child of the root node is blank or contains only character data lacking any further relationships. In either instance the DTD 100 is determined to be a valid construction by the validation process 300 and therefore subsequent processing of the matrix representation 115 can occur without concern for logical discrepancies in the representation of the data matrix by the matrix tables 200. In one aspect, in the current node under analysis, the XML identifier "#PCDATA" is recognized by the edit input module 290 as comprising only character data contained within the node with no relationships to further children (thus resulting in termination of the validation process for the root node). This process 300 is then repeated for each unique node name in the DTD in a manner similar to that described above for the root node.

If the child determination state 305 identifies the presence of a child node, the validation process 300 proceeds to a name validation state 310. The name validation state 310 checks for proper construction of a name attribute that will be associated with the node name field 212, 232 of the matrix table 200. This process is repeated for each child node to insure that all nodes in the matrix representation have a corresponding name that is properly formatted and distinguished. If name validation fails for any node in the matrix representation 115 the process proceeds to a terminal state 315 where an error condition is identified and returned. In instances where an error condition has occurred, the validation process 300 is halted and the DTD 100 is identified as failing to provide a valid construction useable in representing the matrix representation 115 and populating the matrix tables 200.

If the name validation state 310 is passed for all nodes in the matrix representation 115, the process 300 proceeds to a loop identification state 315 where each node is tested against the currently building data structure to determine, based on its iteration code, if an infinite loop will result. Although various legal iteration codes and associated structures can be described by the matrix representation 115 and corresponding matrix tables 200, an infinite loop renders the data structure indefinite. Infinite loops occur when there is a circular relationship within the matrix representation 115 and the iteration code for the nodes along the path, specified for example by the traversal definition, is designated such that an irresolvable or unending path would be defined.

Because a DTD containing an infinite loop cannot properly be resolved, identification of such a condition is made during the loop identification state 315 to prevent the system from generating an unresolvable matrix representation. In the case of infinite error identification, the process 300 proceeds to the terminal state 315 where an error condition is identified and returned.

If the input values for the DTD pass the aforementioned edit checks of name validation 310 and infinite loop identification 315, the process 300 proceeds to the terminal state 325 where the update database module 292 receives the validated information for further processing. As previously indicated, this process 300 is useful in establishing that the input DTD 100 can be properly represented by matrix representation 115 without introducing nondeterministic or unresolvable logical relationships. For every unique node name desired within the DTD, the process 300 must be executed until a complete structure has been reached as depicted by the matrix representation 115.

Figure 6:
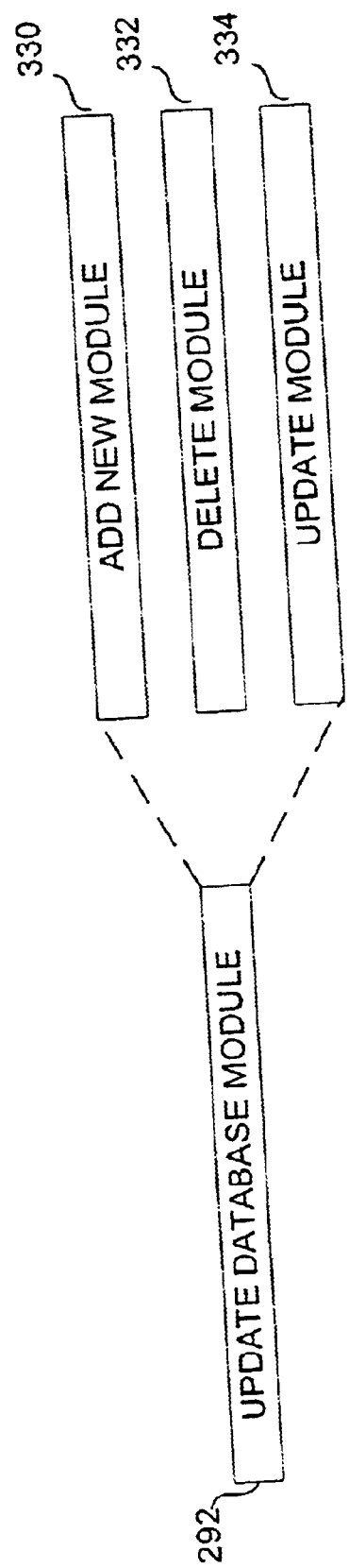
FIG. 6 illustrates one embodiment of an update database module used in conjunction with the matrix table set.

When control is passed to the update database module 292 a request for rearrangement or database updating can then be made. As shown in FIG. 6, the update database module 292 comprises three modules including: an add new module 330, a delete module 332, and an update module 334. These modules 330, 332, 334 perform operations necessary to populate the matrix tables 200 with valid information that has been passed to the update database module 292 by the edit input module 290. Briefly described, the add new module 330 incorporates new entries or elements into the matrix tables 200 representative of nodes within the matrix representation 115. The delete module 332 removes elements from the matrix tables 200 representative of nodes within the matrix representation 115 that may be desirably removed from a current matrix. The update module 334 changes information, relationships, or entries within the existing matrix representation 115 to reflect desirable alterations in the DTD 100. As will be described in greater detail hereinbelow, the functionalities of these modules 330, 332, 334 are used in conjunction with various methods to generate the matrix representation 115 using the matrix tables 200 and to further update or modify the contents of the matrix tables 200 to reflect desired alterations in the DTD 100.

Figure 7:
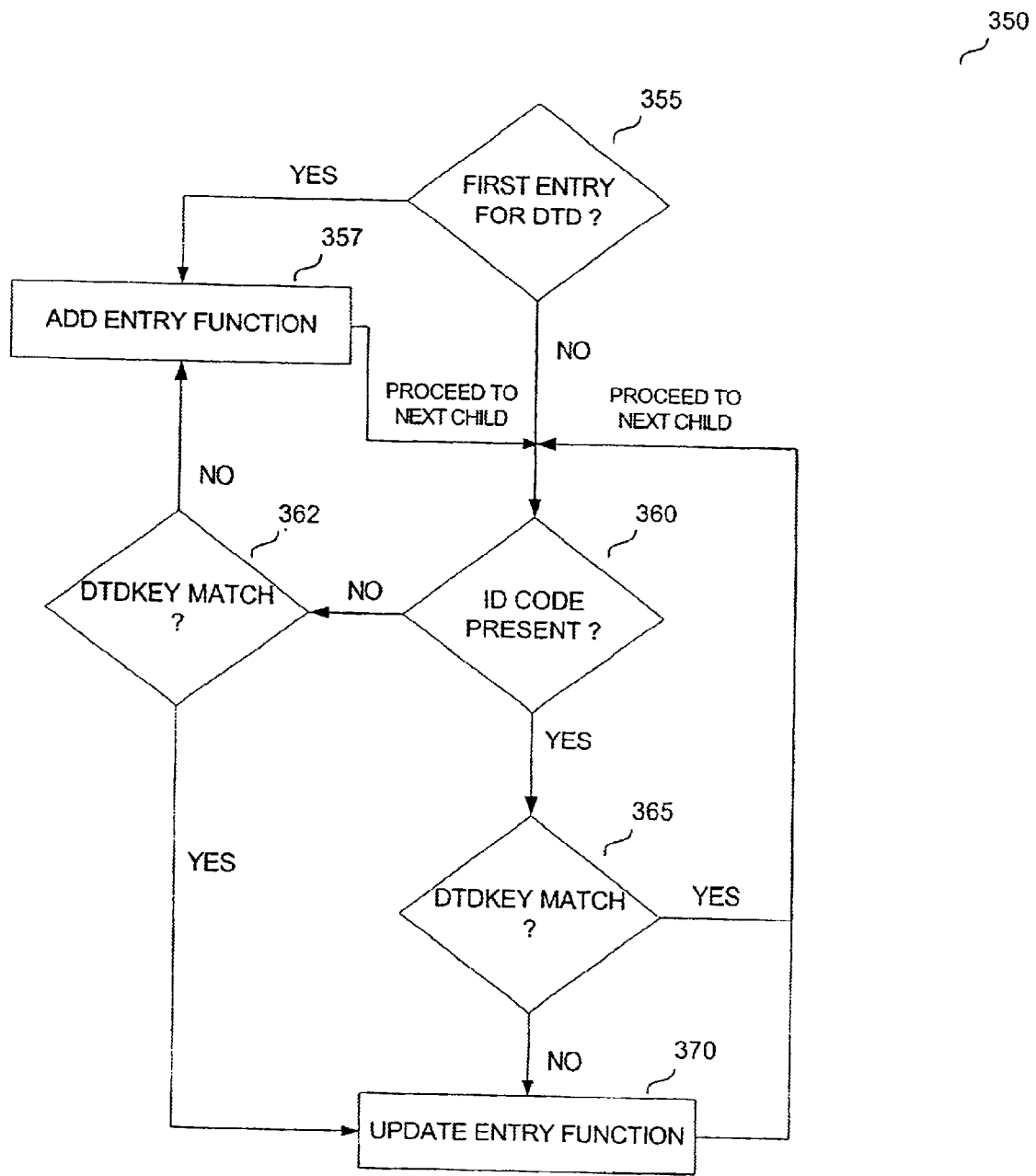
FIG. 7 illustrates one embodiment of a process used for creating and updating the matrix table.

FIG. 7 illustrates a process 350 used for creating and updating the matrix tables 200 to reflect a desired matrix representation 115. This process 350 may be called by the update database module 292 after validation of the input data by the validation process 300 by the edit input mode 290.

The process 350 commences with the determination 355 of whether a matrix table set 200 exists for the current data elements. If the current call is the first call to the create DTD module 280, an initial entry is created in both the DTD structure table 210 and the DTD key table 230 using the node data as input to a add new entry function in state 357. As will be discussed in greater detail hereinbelow, the create DTD module 282 utilizes the add new module 330 to enter the data from the input node into the matrix tables 200 using the add new entry function. Entry of this data therefore creates a new matrix representation within the matrix tables 200 that may be subsequently populated with additional data and relations. Furthermore, the newly entered data (representative of the first entry for the DTD 100) by the add new module 330 represents the root node in the matrix representation 115.

If the input node data is not the first entry for the matrix representation 115 of the DTD 100 (i.e. a root node already exists) then the node data is considered to be child node information and the associated information, attributes and relationships are entered into the existing matrix tables 200. In processing the child node information, the process 350 identifies ID code information in state 360 that may be associated the current child node being processed. If ID code information is identified, the process 350 proceeds to a determine if a DTD key match is present in state 365. In this state 365, the DTD key table 230 is checked for a previous description of the child node by attempting to match the ID code with one of those codes present in the DTD key table 230. If a matching ID code and DTDKEY are found in state 365, no change is made and the process 350 proceeds to the next child node where identification of the ID code for the node is made in state 360.

When no ID code is found for the child node in state 360 and no DTDKEY match is identified in state 362, the child node information is entered into the existing matrix tables 200 in state 357 by the add entry function. If no ID code is found for the child node in state 360 but a DTDKEY match is identified in state 357, the process 350 proceeds to a state 370 where an update entry function is called to update the matrix tables 200 with the current node information. Alternatively, when an ID code for the child node has been identified in state 360 but no match is found between the ID code and the DTDKEY in state 365, the current node information is determined to not be present in the matrix tables 200 and the process proceeds to the update entry function in state 370.

Using the abovementioned process 350 traversal of all nodes within the matrix representation 115 is accomplished and the information contained in the nodes is entered into the matrix tables 200. In this process 350, the checkpointing operations of ID code identification and DTDKEY matching are desirably implemented to insure that the matrix representation is accurately reflected in the matrix tables 200. Furthermore, these operations prevent existing node data from being overwritten or updated in an inappropriate manner.

Figure 8:
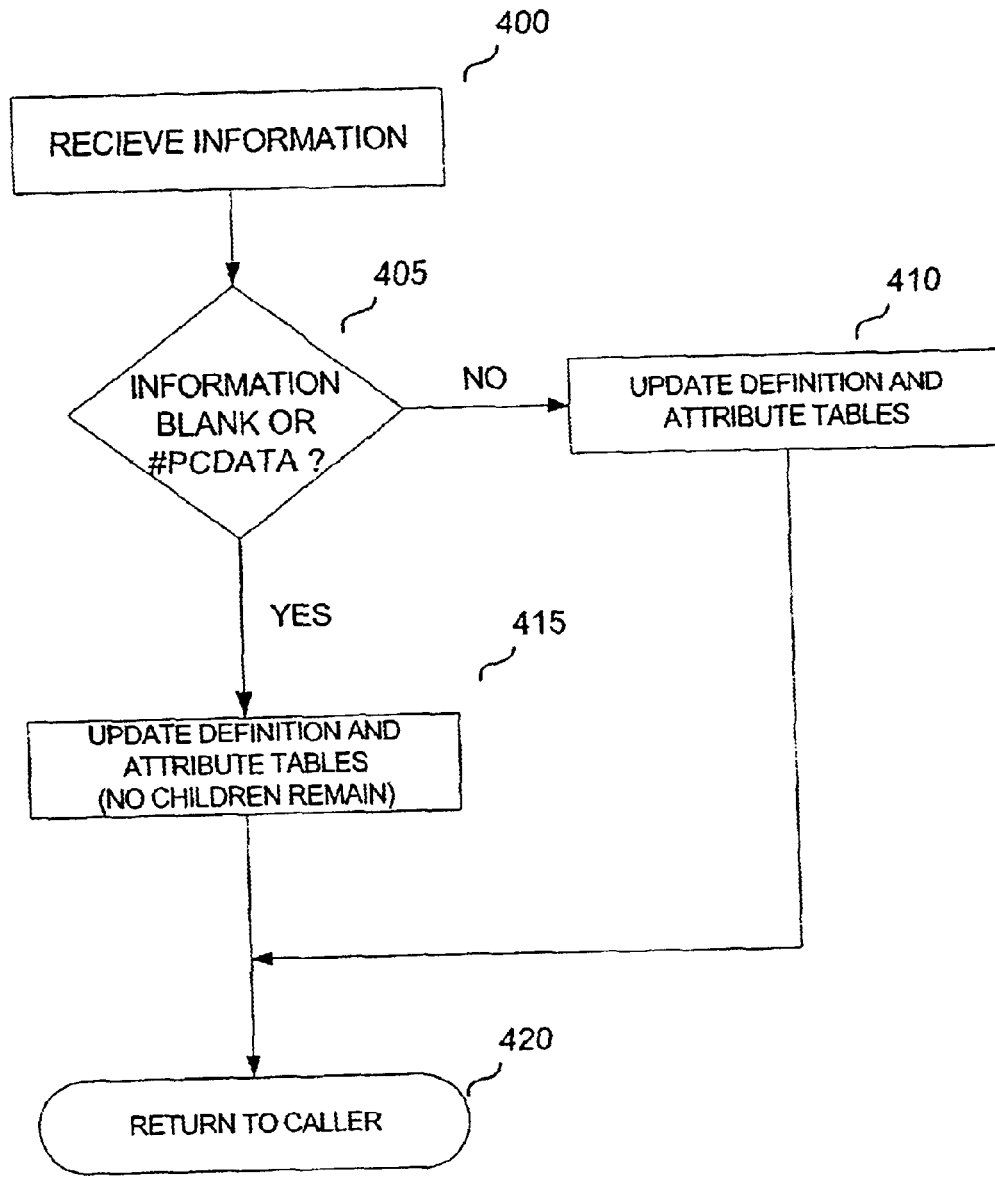
FIG. 8 illustrates one embodiment of an add entry method used in conjunction with the matrix table set.

FIG. 8 illustrates one embodiment of the add entry process 357 used during the matrix table creation and update process 350. This method 357 adds node entries comprising data and information into the DTD structure table 210 and key table 230 when a unique ID is encountered by the creation and update process 350. In this method 357, the information corresponding to the node entry is inserted into the DTD structure 210 wherein information associated with the node name 212, the current child 214, the unique sequence code 218, and the iteration code 216 are updated for the particular node entry. In one aspect a linked list data structure is created for each child node using the sequence 218 and next sequence 220 fields. This linked list structure is but one example of a suitable data structure that may be used to maintain siblings in the predefined order entered by the user. The use of the linked list structure also allows for rapid updates to the matrix representation since only the "links" or references of the linked list need to be moved to effect a desired change in order, rather than all of the records. These fields 218, 220 contain pointers or references to associated nodes by pointing to appropriate field information in the matrix tables 200. Furthermore, the node ordering can be accomplished using alternative data structures such as stacks, queues, hash tables and the like. It will be appreciated that other data structures can also be implemented to perform the sibling maintenance functionality and as such these additional implementations are conceived to be additional embodiments of the present invention.

The add entry method 357 commences in a state 400 where node information is received from the update database function 350. A determination is then made in state 405 to determine if the child is either blank or has the value of "#PCDATA" (indicating text only information with no subsequent references or associations). If the child node does not contain reference to further nodes, the fields of the DTD structure and attribute tables 210, 250 are updated with information from the current child node in state 415 and no entry is made in the DTD key table indicating no other Child entries will be associated with the current child. Otherwise, when the child node information is found to contain valid reference information to other child nodes, the method 357 proceeds to a state 410 where the information from the current child node is updated and the subsequent child nodes are processed recursively by the method 300. When the update process for all child nodes has been completed, the method 357 proceeds to a state 420 that returns control to the caller (or the update database function in this embodiment).

Figure 9:
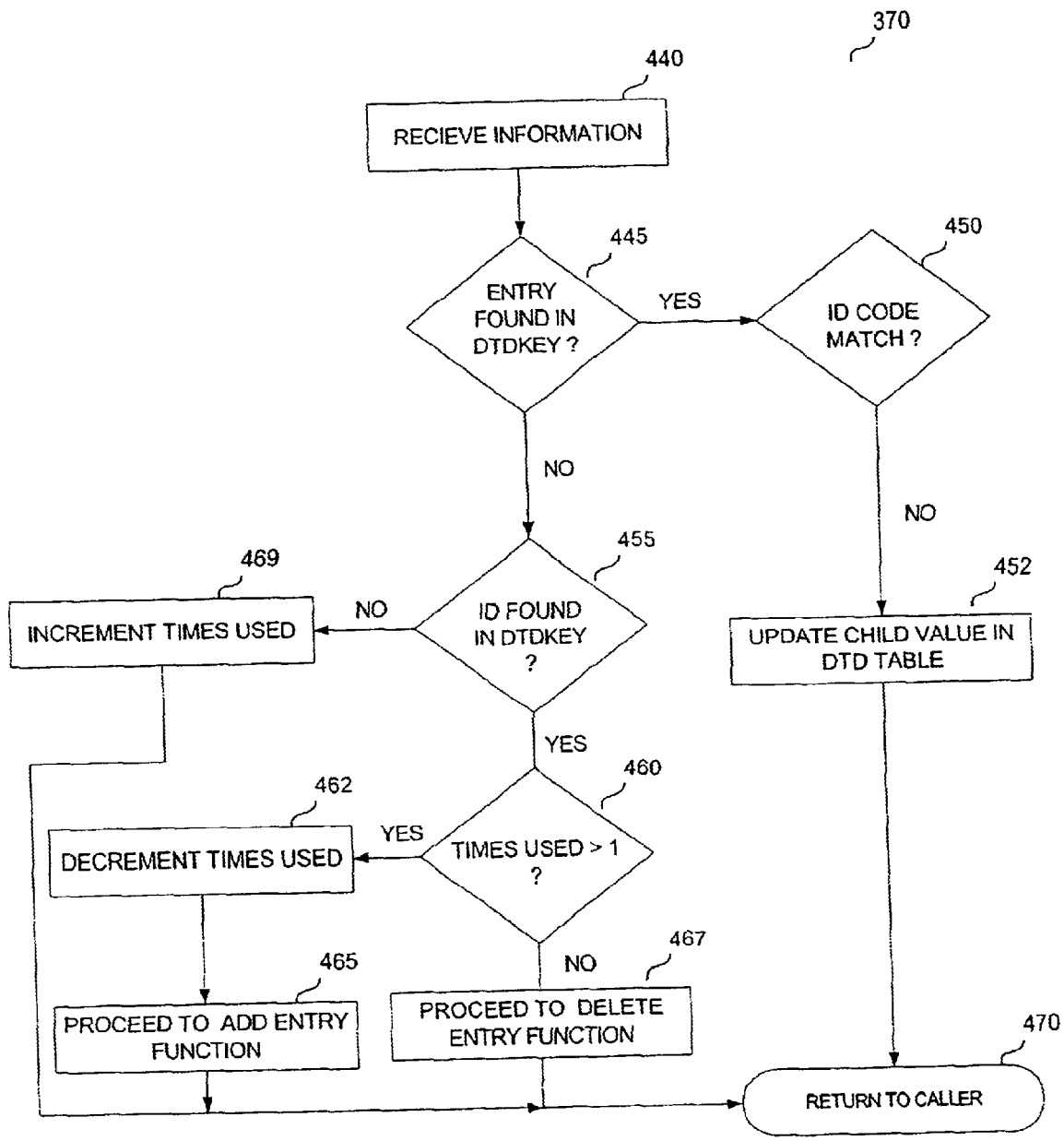
FIG. 9 illustrates one embodiment of an update entry method used in conjunction with the matrix table set.

FIG. 9 illustrates one embodiment of the update entry process 370 used to enter information in the matrix tables 200 of the matrix representation 115. Like other methods of the system 172, this process 370 incorporates a number of conditional data checks to determine the action that should be taken when transforming the DTD 100 into the matrix representation 115. The update entry process 370 commences in a state 440 where node information is received from the update database function 350. Conditional data checks used in this process 370 commence with a DTDKEY check 445 to determine if the current node is represented in DTD key table 230. Should the DTDKEY key check 445 positively identify the name in the DTD key table 230 then the process 370 proceeds to an ID code check state 450 that determines if the current node possess an ID code that matches an entry in the DTD key table 230. If the ID code is determined not to match in state 450 the process 370 proceeds to a new state 452 where the current child value is updated to reflect the new child value.

Returning to state 445, if the entry is not found or the entry is blank, but an ID code exists, as determined by state 455, then the times used field 236 in the DTD key table 230 corresponding to the current ID is checked in state 460. In this state 460, if the times used value is determined to be greater than "1" the value is decremented in state 462 and the process 370 proceeds to a state 465 where the add new entry function is called on the current child if it is not blank. The results of this call create a new entry in both the DTD structure and the DTD key tables 210, 230.

Returning to state 460, if the times used field 236 is equal to "1" then the process 370 proceeds to a state 467 where a delete entry function 467 is called with the current ID value.

Returning to state 455, if an entry is found, but there is no matching ID Code present in the DTD key table 230 then the process 370 proceeds to state 469 where the times used value is incremented in the DTD key table 230 and a new record corresponding to the information contained in the child node is stored as a new record in the matrix tables.

Figure 10:
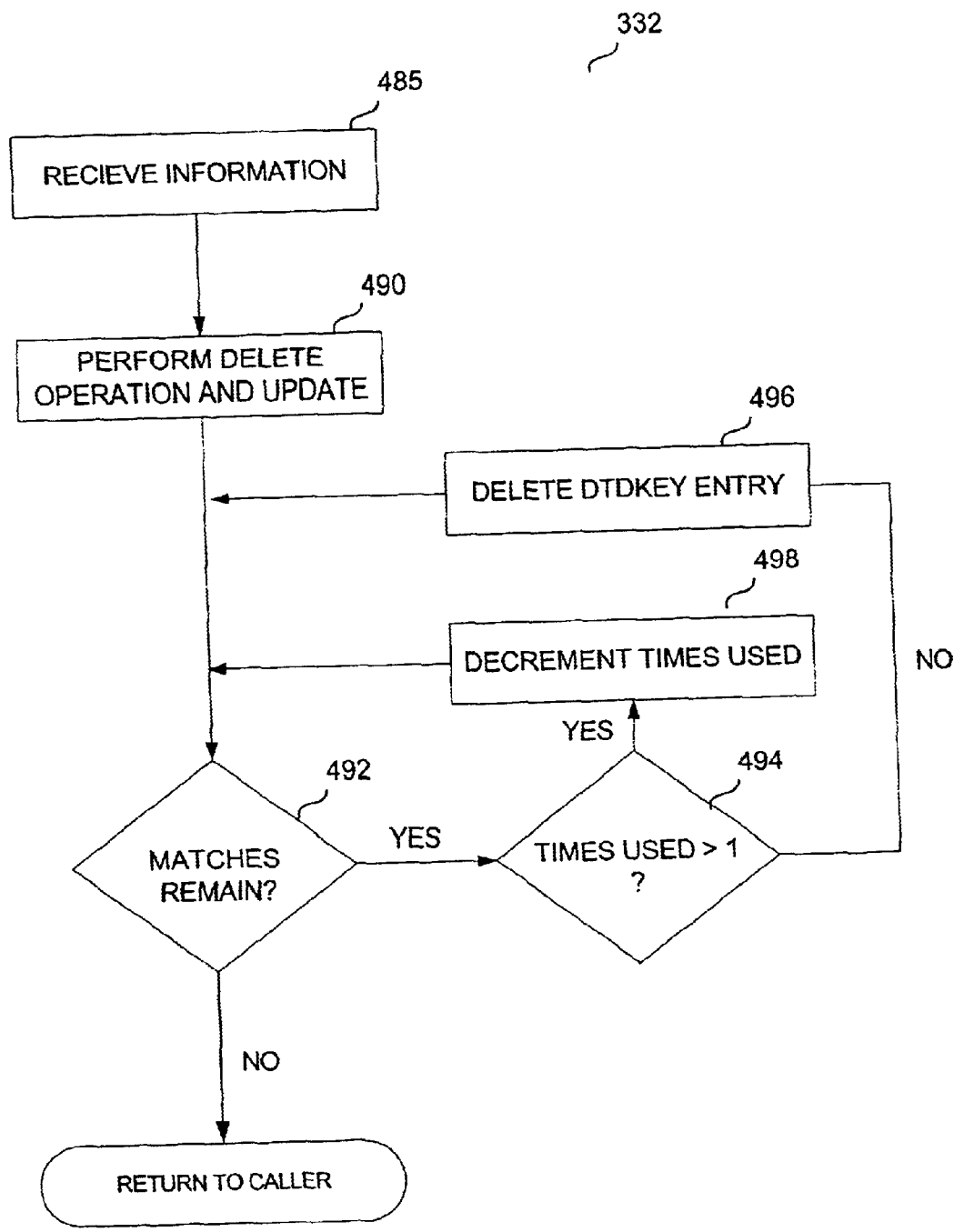
FIG. 10 illustrates one embodiment of a delete entry function used in conjunction with the matrix table set.

FIG. 10 illustrates one embodiment of the delete entry process 332 to remove node information from the matrix representation stored in the matrix tables 200. In one aspect, the delete entry function 332 receives node information in state 485 and proceeds to state 490 where the delete and update operations are performed. During the delete operation the process 332 proceeds through a series of states to find all instances in the DTD structure where the node to be deleted exists for a given ID value and deletes all records for that node and all of the node's children recursively. The recursive removal of the node's children is performed in state 492 by identifying a record in the DTD key table 230 having the ID value to be deleted. For each ID match that is made in state 492, the function proceeds to state 494 where the times used value is identified. If the times used field 236 is equal to "1" then the entry is deleted in state 496. Otherwise the times used value is decremented in state 498.

If a record exists in the DTD structure table 210 that has a child name field 214 equal to the current node being deleted, then the update sequence 218 and next sequence 220 values are updated accordingly. In the above-described instance where a linked list data structure is used in conjunction with the node definitions, the values contained in the sequence 218 and next sequence 220 fields are updated according to linked list rules for organization and the record is deleted.

The above mentioned delete entry process 332 removes nodes using the value of each child until there a no more nodes to be deleted in the current recursive deletion sequence.

Figure 11:
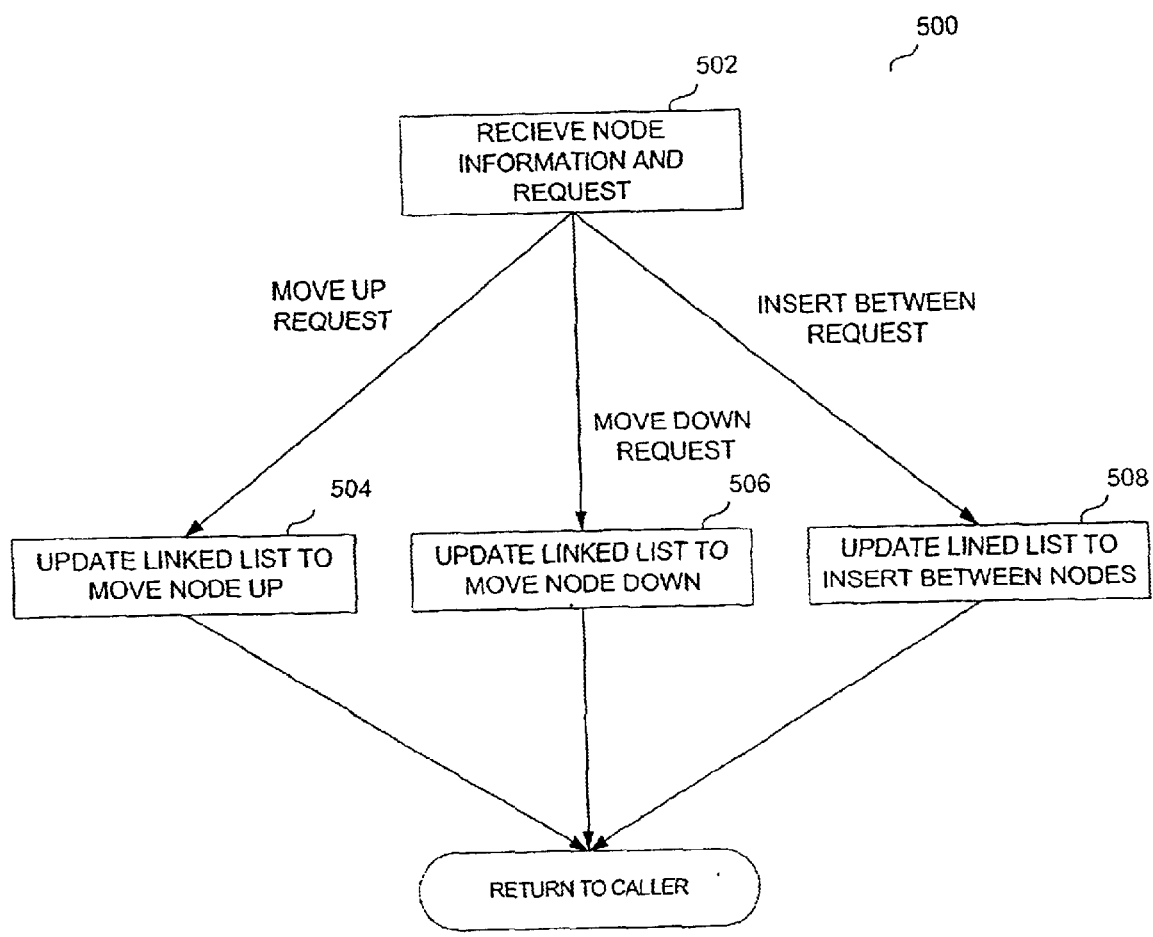
FIG. 11 illustrates one embodiment of a re-arrange function used in conjunction with the matrix table set.

As previously described, the update database module 292 may be called with a re-arrange request. In one embodiment, the re-arrange request serves to alter the relationships in the matrix representation. A re-arrange process 500 shown in FIG. 11 performs the operations necessary to modify the contents of the matrix tables 200 to accommodate changes to the matrix representation 115. The re-arrange function 500 performs a number of operations related to manipulation of the matrix tables 200 and may include a move-up function 504, a move-down function 506, and an insert between function 508. Each function 504, 506, 508 may further be called by the update database module 292 upon receiving the node information and a request in the form of a code or data sequence in state 502.

If a request is received to perform the move up function 504, the first flag 222 and the next sequence value 220 of the DTD structure table 210 corresponding to the values passed are updated. In one aspect, the passed values result in the an updating of the linked list structure such that node referenced by the passed values is moved up in relation to other nodes within the linked list represented by the DTD structure table 210. In a similar manner, other child nodes with dependencies or references to the current node referenced by the passed values are similarly moved up in the structure. Thus when the move up function is called and the node operation is performed, the relationships between the current node and its corresponding child nodes are preserved to maintain consistency in the data schema.

If the move up command designates a node that is already the first node in the structure (i.e. the root node with a first sequence flag value of "1") there will be no action taken to modify the linked list structure as the node cannot be moved up any further in the list. Otherwise, the normal operations associated with linked list programming techniques can be applied to update the next sequence value 220 to contain the appropriate values representative of the updated position of the node in the list or table.

If a request is received to perform the move down function 506 the first flag 222 and the next sequence value 220 of the DTD structure table 210 corresponding to the values passed are updated in a similar manner to that described above for the move up function 504. Using the move down function 506, the passed values result in the updating of the linked list structure such that node referenced by the passed values is moved down in relation to other nodes within the linked list represented by the DTD structure table 210. In a similar manner, other child nodes with dependencies or references to the current node referenced by the passed values are similarly moved down in the list. If the move down command designates a node that is already the last node in the list (designated by a next sequence value 220 equal to "0") there will be no action taken to modify the linked list structure as the node cannot be moved down any further in the structure. Otherwise, the normal operations associated with linked list programming techniques can be applied to update the next sequence value 220 to give the effect of moving the current node down in the structure.

If a request is received to perform the insert between process 508, the first flag 222 and the next sequence value 220 of the DTD structure table 210 corresponding to the values passed are updated to reflect the desired position where the node will be inserted within the matrix representation 115. If the next sequence value 220 is "0" then the node is identified as the last node in the structure and no action is taken. Otherwise, the insert between function 508 inserts a new record into the DTD table structure 210 with the current node name 212 and the child name set 214 to blank. Additionally, the next sequence value 220 is appropriately set on this record and associated records to give the effect of inserting a new child into the structure. In one aspect, the newly inserted record becomes a place holder whose values can be updated by later operations.

Taken together the above described operations provide necessary functionality to manipulate and organize the contents of the matrix tables 200. Although these operations have been described in the context of a recursive mode of organization, using linked lists to maintain order at any given level, it will be appreciated by one skilled in the art that other data structures may be used to perform similar functions to represent the matrix representation and re-arrange its contents as needed or desired.

Figure 12:
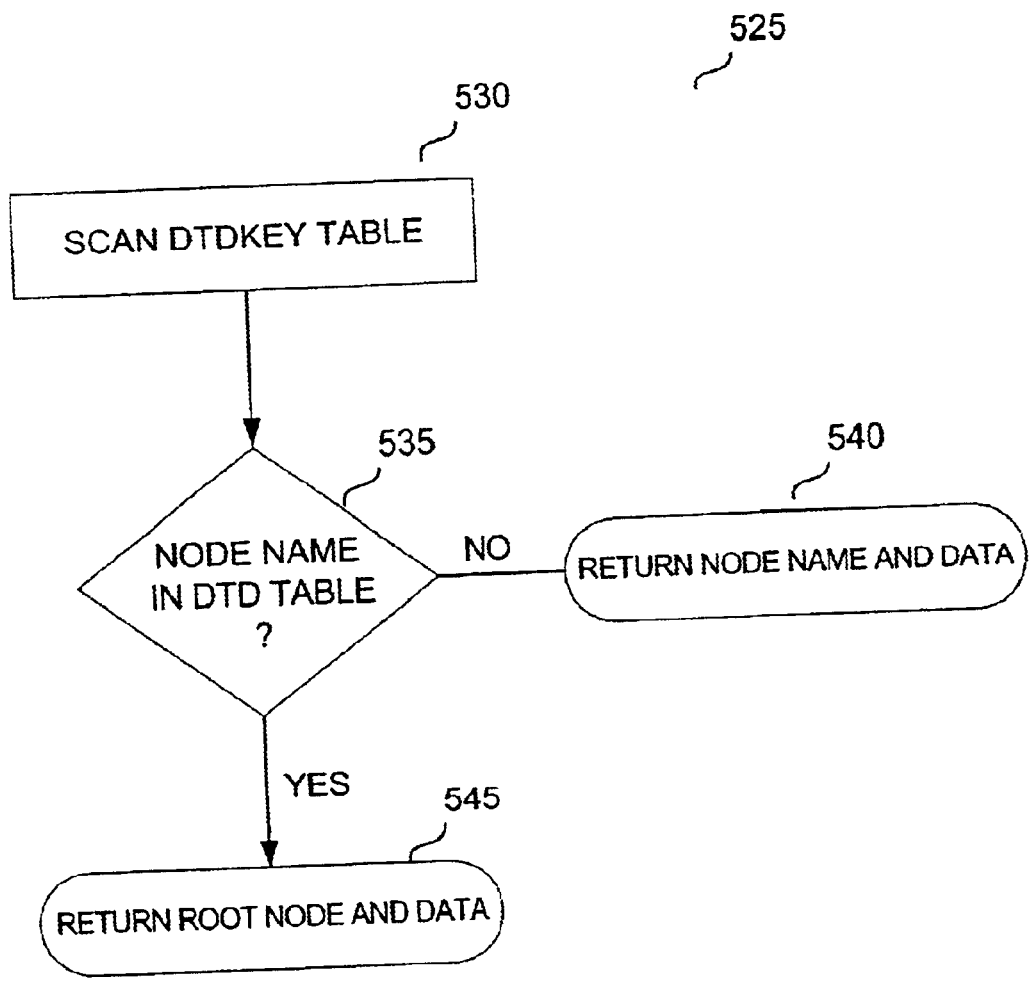
FIG. 12 illustrates one embodiment of a determine next action method used in conjunction with the matrix table set.

FIG. 12 illustrates a process 525 used by the determine next action module 294 of the create DTD module 282. This process 525 functions to determine the next action taken by the system 172 after a function call, give control back to the appropriate caller, and ready the next request or operation to be performed. The method 525 commences in a scan DTD key table state 530 where the DTD key table is read through and the DTD structure table 210 is checked for records containing nodes that match each key (state 535). If no records are found, the process 525 terminates in state 540 and the node is returned to the caller will all children, associated iteration codes, ID's and attributes. At this point, the caller is freed to perform other operations with new nodes and input information at which point, process 300 will begin again. In the instance where all DTDKEY entries have corresponding nodes in the DTD structure table 210, the storage of the matrix representation 115 in the matrix tables 200 is completed in state 545 and the original root node and its associated children, iteration codes, ID's, and attributes are returned to the caller for update processing and the structure is considered complete.

The aforementioned functions, processes, and modules operate in a coordinated manner to generate a logical construction of the matrix representation 115 within the matrix tables. In one aspect, the logical construction represents only the nodes and relationships between the nodes defined in the matrix representation 115. Completion of these operations therefore provides the skeletal framework of the DTD and its logical constraints. As will be described in greater detail hereinbelow, other functions, processes, and modules of the system 172 are then desirably employed to populate the skeletal framework of the DTD 100 with data and information representative of specific information that is to be stored in the DTD 100. Furthermore, the populated DTD structure can then be used to generate structured documents which can be requested or returned to a user as needed or desired.

Figure 13:
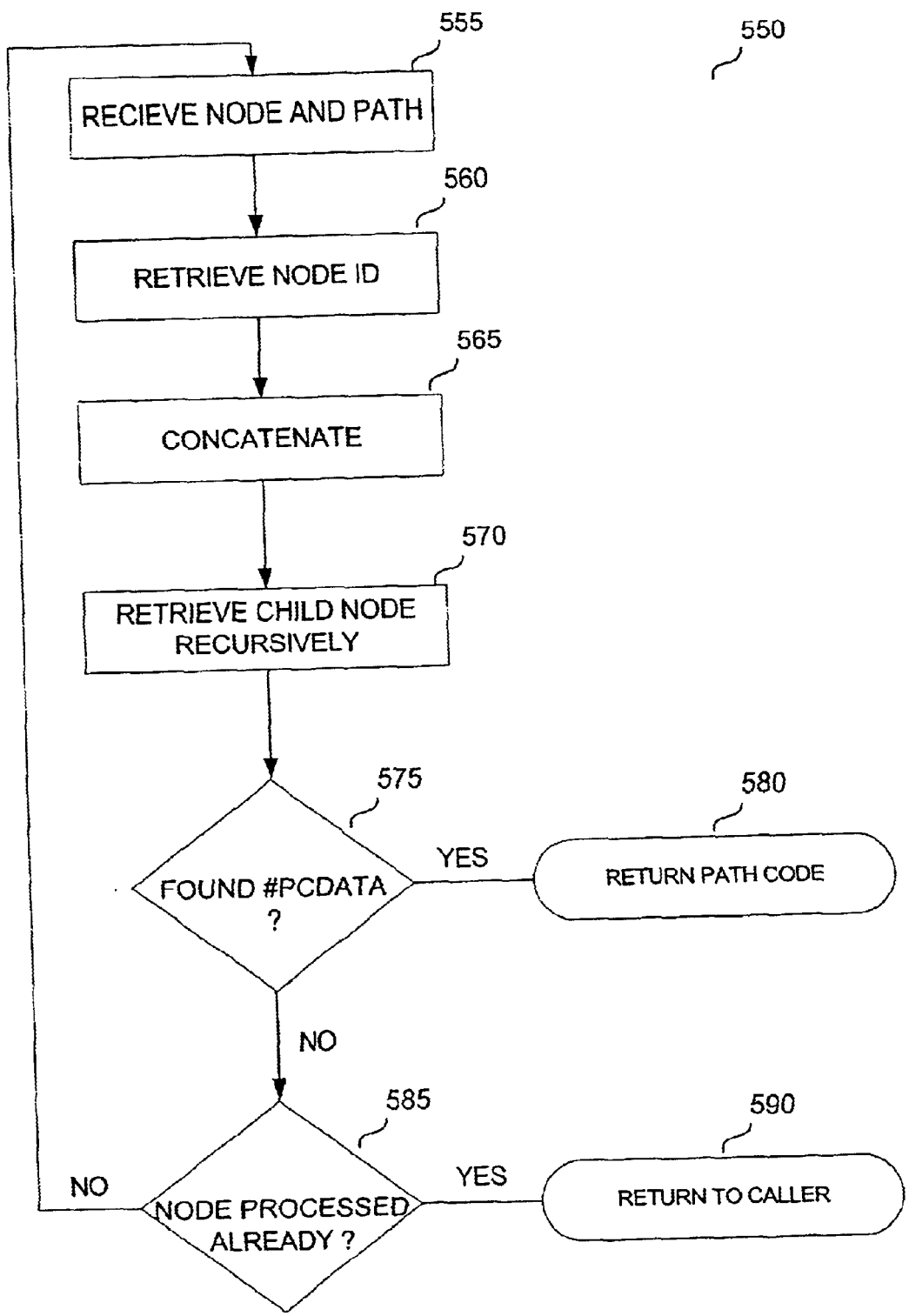
FIG. 13 illustrates one embodiment of the functionality of the populate DTD module used in conjunction with the matrix table set.

FIG. 13 illustrates exemplary functionality of the populate DTD module 284 which processes information representative of data represented by the DTD 100. In one aspect, this module 284 utilizes a dedicated process 550 to populate the DTD structure with markup language information such as XML data. The process 550 operates by constructing a path to the desired node with the child attribute set 214 to "#PCDATA" and the attribute structure in the matrix table set 200 is reviewed to determine the allowable types of data. This process 550 desirably returns all paths to the caller, and allows the caller to select a desired path to utilize when storing data within a node. To construct each path, the process 550 commences by receiving a node and path in state 555 (beginning with the root node and current path from the DTD structure table 210). The process 550 then proceeds to a state 560 where the ID code for the associated Node is retrieved using the DTD key table 230. The ID code information for the node is then concatenated in a defined format in state 565 to build the path data or instructions used to traverse the matrix representation 115. In one aspect, the aforementioned dot notation may be used to symbolize the traversal order where the ID code is added to the current path value. The process 550 then calls each child recursively to determine if "#PCDATA" exists in the path to the node (state 575). If "#PCDATA" or another desired text identifier is encountered, the process 550 proceeds to a state 580 where the process terminates and the current path is returned to the caller. Otherwise the process 550 determines if the node has been processed earlier in state 585. In one aspect, the identification of the node having been processed earlier may result from the structure being formed as a "matrix" and not as a typical hierarchical structure. If it is determined that the node had been encountered previously, the process 550 proceeds to state 590 where the process 550 terminates and control is returned to the caller.

In state 585, when it is determined that the node has not been encountered before, the process 550 returns to state 555 where a new node is recursively retrieved giving the child as the node and passing the current path. Based upon the iteration code, the process 550 may return a given path to the caller and query if another iteration is desired. In the case of further iteration, the module continues processing the nodes in the manner described above.

In one aspect, the recursive calls and caller requests for selected information during iterations of the abovementioned process 550 may result in the return of a plurality of paths to the desired node. This allows the caller to select a particular path from the available paths and use it to store appropriate data based upon the attributes of the node into the XML structure 270 using the selected path as the key.

Figure 14:
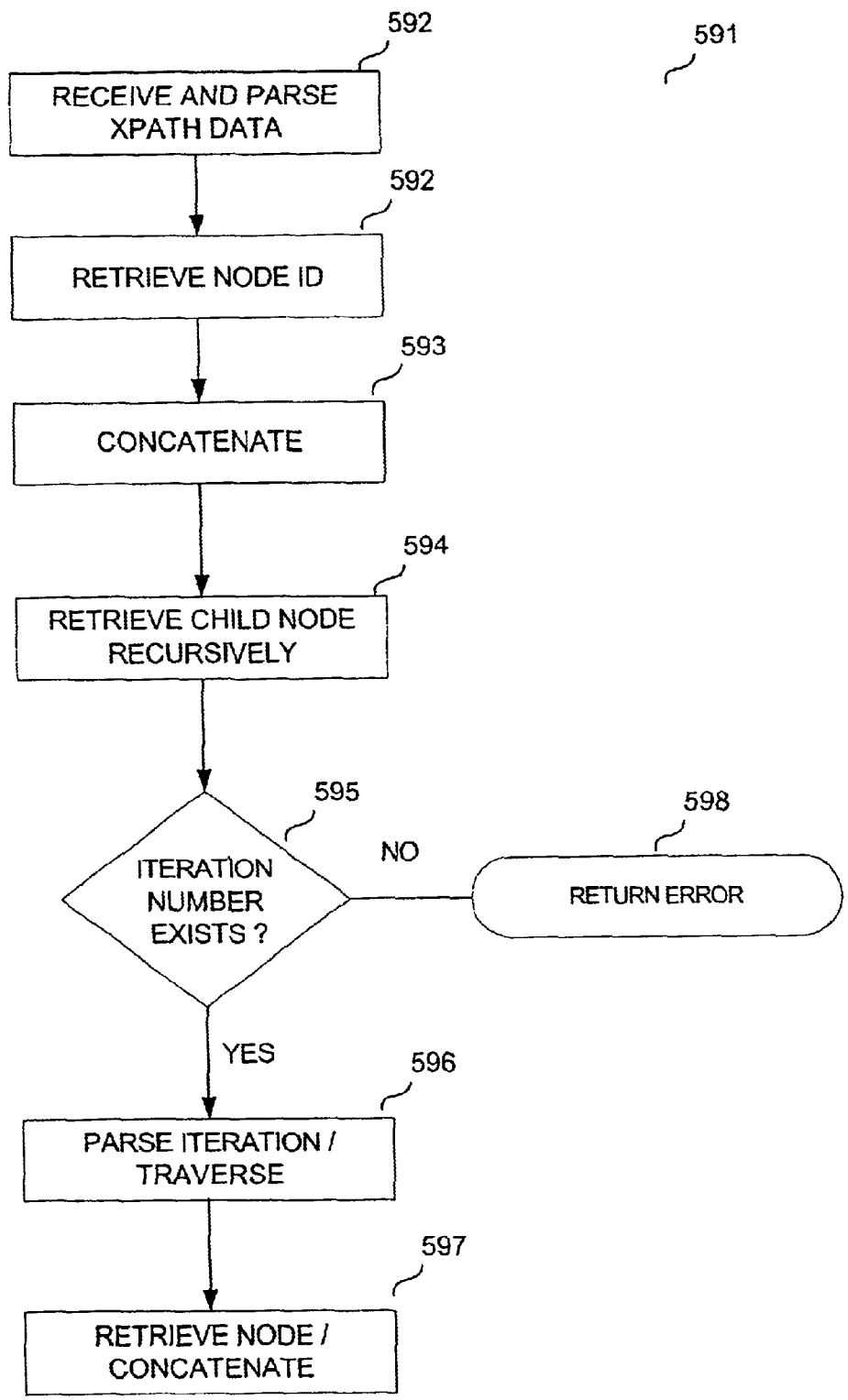
FIG. 14 illustrates another embodiment of the functionality of the populate DTD module used in conjunction with the matrix table set.

FIG. 14 illustrates an alternative functionality of the populate DTD module 284. In this embodiment node information can be updated by supplying a node definition in W3C standard XPATH notation. The populate DTD module 284 uses this information to select a matrix key 270 where appropriate an permits the selecting and updating of single objects within the matrix representation. As shown in FIG. 14, the process 591 begins in a state 592 where XPATH notational sequences or data is received and parsed to identify individual elements within the sequence. For each element in the XPATH data, the process retrieves the ID code in state 592 and concatenates the ID code in a defined format in state 593. If an iteration number exists, as determined in state 595, the iteration number is parsed and traversed in state 596. The resulting traversal follows the linked list of nodes until the node containing an ID code equivalent to the iteration is reached. This node is retrieved in state 597 and the correct sequence number is then concatenated to update the node definition. If the iteration number is determined not to exist in state 595, an error is returned in state 598 indicating that at least a portion of the structure is missing.

Figure 15:
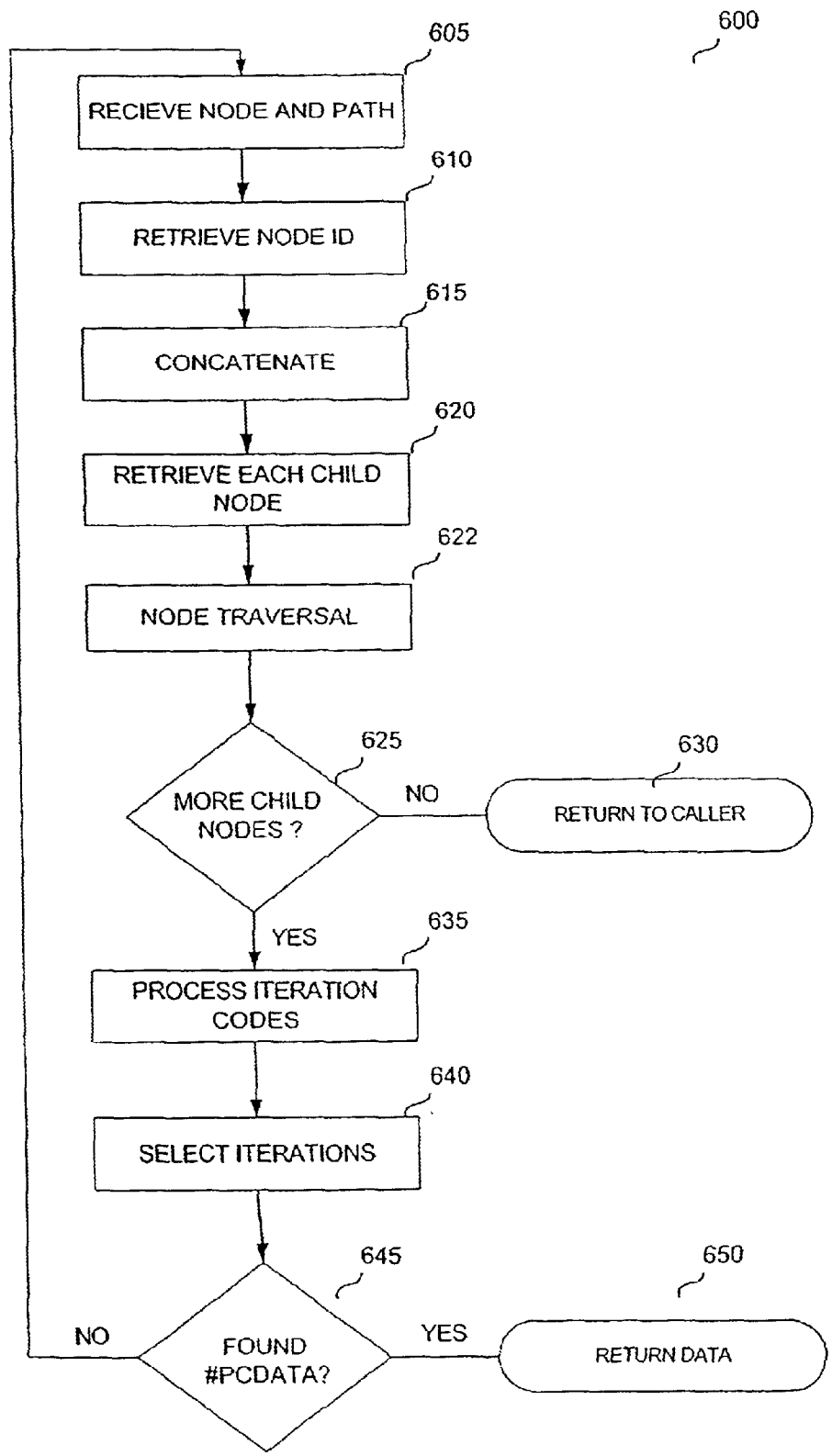
FIG. 15 illustrates one embodiment of the functionality of the generate document module using a document generation process.

FIG. 15 illustrates exemplary functionality of the generate document module 286 using a document generation process 600 which creates structured documents using the matrix representation stored by the matrix tables 200 and contains data represented by the DTD 100. In order to generate a document from the DTD/XML structure, one or more paths are constructed to the desired child node set to "PCDATA" (or other text identifier) and the attribute structure is identified to determine the types of data that are to be generated. The process 600 desirably returns data associated with the paths to the caller of the generation process 600 to provide a means to construct the entire document using the data access paths.

The process 600 commences by inputting a selected node from the DTD structure and current path in state 605. Typically, the first input node comprises the root node and the process 600 proceeds to a state 610 where the ID code for the Node is retrieved from the DTD key table 230. The ID code information for the node is then concatenated in a defined format in state 615 to build the path data or instructions used to traverse the matrix representation 115. In one aspect, the aforementioned dot notation may be used to symbolize the traversal order where the ID code is added to the current path value. In state 620 each child is retrieved by fetching all records from the DTD table that match the selected Node. The linked list structure, 500 is traversed to maintain order among siblings. For each child, the linked list structure in 270 is also traversed for any repeating iterations of a node to maintain proper data ordering. The process 600 subsequently performs a recursive retrieval in state 625 giving the child as the node and passing the current path. Based upon the iteration code in state 635, the process 600 may retrieve multiple iterations of the path in state 640. When "#PCDATA" is encountered in state 645, the process 600 retrieves the data from the XML structure 270 and returns to the caller in state 650. In the case of further iteration, the module continues processing the Nodes in the manner described above. Based on the recursive calls and defined iterations, a complete document may be generated by the method.

The invention as described herein may be used in conjunction with most data or document preparation and presentation systems. As such, this invention may be adapted to applications which include: connection and integration of existing businesses database systems to permit complex data representations to be created and represented, document and knowledge management through the use of XML as a document representation language, development of XML applications using a dedicated platform applications for creating the data representations in the database. Furthermore, the system 172 is adaptable for use with and on intra, inter and extranets through standard browser-based applications.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

For example, the technology disclosed herein, may be developed and deployed on Internet Standard and Open Source code and can be implemented on a variety of hardware and software platforms such as LINUX or Microsoft NT operating systems running on Intel CISC based servers. The software may also be implemented on UNIX operating systems running on a variety of RISC based computers from vendors such as Hewlett Packard (HP) and Sun Microsystems (SUN), for example without significant modification to existing source code. In addition, the software is adaptable to Oracle's Oracle Application Server web server software and the Open Source Apache web server. Furthermore, the system 172 can be implemented on other Open Source and proprietary web servers such as Microsoft's IIS with the addition of custom PERL CGI scripts to send and retrieve data to and from the database to the web server. In a particular embodiment, the software implementing the functions according to the present invention can be programmed using Oracle's PL-SQL programming language. This code is desirably stored as procedures in a physical Oracle database. The use of JAVA, C++ or other programming languages permits other physical data bases to be used such as IBM's DB2, Sybase or Microsoft SQL Server. Although this invention is designed around the relational database model, it can be mapped to any model that does not restrict the user to only hierarchical structures. This allows the table structures described herein to be implemented using various database models, including but not limited to flat files and object-oriented relational database models.

As previously discussed, one significant benefit of the structural document generation system is the use of the reduced database table configuration. This database configuration incorporates a fixed table number to encode and store the transformed DTD structure represented by the matrix representation as well as the information which is used to populate the encoded DTD. Since the table number is fixed, the database becomes highly scalable and can be used to represent both simple and highly complex DTDs with substantially less administrative overhead as compared to the prior art. Conventional systems for DTD representation are limited by undesirable table complexity (i.e., more tables that must be relationally interconnected) which increases significantly as the complexity of the DTD increases. Therefore, the present invention can be used to accommodate many different types or classes of DTDs with more efficiency compared to the prior art.

Additionally, the present invention addresses the need for a DTD definition scheme that can be used to resolve complex relationships that may not be supported by conventional systems. For example, recursive, repetitive, and multiple dependent elements may be readily defined using the DTD matrix transformation. Furthermore, the deterministic traversal paths or matrix traversals are used to resolve potential non-determinism in a DTD representation adding increased flexibility and convenience to defining templates for structured documents.

A further feature of the present invention is that the matrix representation methods described herein preserve the structural characteristics of the DTD. For example, if a hierarchical ordering of elements or information is presented in the input DTD, the matrix transformation processes may preserve the underlying hierarchical order which is reflected in the output structured document. This is also true for non-hierarchical orderings of the input DTD that are likewise preserved when output as a structured document.

Although the foregoing description of the invention has shown, described and pointed out novel features of the invention, it will be understood that various omissions, substitutions, and changes in the form of the detail of the apparatus as illustrated, as well as the uses thereof, may be made by those skilled in the art without departing from the spirit of the present invention. Consequently the scope of the invention should not be limited to the foregoing discussion but should be defined by the following claims.

What is claimed is:

1. A system for structured document generation, the system comprising:

a data structure input module which receives a data structure having a defined arrangement comprising one or more data elements having identifying relationships that associate the data elements;

a transformation module which transforms the data structure into a matrix representation to thereby preserve the defined arrangement of the data structure and wherein the matrix representation comprises an internally recognized organization of the data structure;

a data element input module that stores user specified information in the matrix representation of the data structure to thereby populate the data structure with information; and a document generation module which accesses the matrix representation to generate a structured document comprising a representation of the information stored in the data elements in a markup language.

2. The system for structured document generation of claim 1, wherein the data structure received by the data structure input module comprises a document type definition that describes the organization of the data elements using an elemental identification scheme recognized by the transformation module.

3. The system for structured document generation of claim 2, wherein the document type definition is specified as an input file received by the data structure input module.

4. The system for structured document generation of claim 2, wherein the document type definition is specified by direct input into the data structure input module.

5. The system for structured document generation of claim 1, wherein the identifying relationships of the data structure comprise recursive relationships between the data elements.

6. The system for structured document generation of claim 5, wherein the recursive relationships between the data elements define non-deterministic relationships that are resolved through transformation into the matrix representation such that a deterministic relationship is produced between the data elements.

7. The system for structured document generation of claim 6, wherein the non-deterministic relationships derived from the recursive relationships that are resolved through transformation into the matrix representation using traversal ordering to produce the deterministic relationships between the data elements.

8. The system for structured document generation of claim 1, wherein the identifying relationships of the data structure comprise repetitive relationships between the data elements.

9. The system for structured document generation of claim 8, wherein the repetitive relationships between the data elements define non-deterministic relationships that are resolved through transformation into the matrix representation such that a deterministic relationship is produced between the data elements.

10. The system for structured document generation of claim 9, wherein the non-deterministic relationships derived from the repetitive relationships that are resolved through transformation into the matrix representation using traversal ordering to produce the deterministic relationships between the data elements.

11. The system for structured document generation of claim 1, further comprising a database that stores the matrix representation.

12. The system for structured document generation of claim 11, wherein the database that stores the matrix representation comprises a fixed number of tables that do not increase as a function of the data structure complexity.

13. The system for structured document generation of claim 1, wherein the markup language comprises extensible markup language.

14. The system for structured document generation of claim 1, wherein the markup language comprises wireless application protocol.

15. The system for structured document generation of claim 1, wherein the defined arrangement of the data structure comprises a hierarchical arrangement of the data structure that is preserved by the transformation module using the matrix representation.

16. The system for structured document generation of claim 1, wherein the defined arrangement of the data structure comprises a nonhierarchical arrangement of the data structure that is preserved by the transformation module using the matrix representation.

17. The system for structured document generation of claim 1, wherein the defined arrangement of the data structure comprises a hierarchical and nonhierarchical arrangement of the data structure that is preserved by the transformation module using the matrix representation.

18. A method for generating markup language data representations of a data schema containing a plurality of elements interrelated by one or more relationships, the method comprising:

defining a matrix representation for the data schema wherein the matrix representation defines the relationships interrelating the elements in such a manner so as to permit the elements to be deterministically interrelated;

mapping the matrix representation of elements into a database structure;

storing information in the elements of the matrix representation; and accessing the information stored in matrix representation and outputting at least a portion of the information using a markup language wherein the format of the information is determined by the elements and relationships of the data schema and is represented by an output markup language.

19. The method for generating data representations of claim 18, wherein the data schema comprises a non-hierarchical structure and the matrix representation preserves the non-hierarchical structure.

20. The method for generating data representations of claim 18, wherein the data schema comprises a hierarchical structure and the matrix representation preserves the hierarchical structure.

21. The method for generating data representations of claim 18, wherein the data schema comprises one or more relationships that are recursively defined and wherein the matrix representation of the data schema resolves the recursive relationships in a deterministic manner.

22. The method for generating data representations of claim 21, wherein the recursive relationships of the data schema are accommodated by defining one or more traversal paths that associate each element with a traversal order to make the recursive relationship resolvable.

23. The method for generating data representations of claim 18, wherein the data schema comprises one or more relationships that are repetitively defined and wherein the matrix representation of the data schema resolves the repetitive relationship in a deterministic manner.

24. The method for generating data representations of claim 23, wherein the repetitive relationships of the data schema are accommodated by defining one or more traversal paths that associate each element with a traversal order to make the repetitive relationship resolvable.

25. The method for generating data representations of claim 18, wherein the matrix representation comprises a fixed table number that does not increase in size as a function of complexity of the data schema.

26. A method for representing relationships between elements in a data schema, the method comprising:
    identifying the elements and the relationships between the data elements of the data schema;
    applying a plurality of matrix transformation operations to encode the data schema; and
    storing the encoded data schema in a database having a fixed number of tables so as to confer independence from data schema complexity.

27. The method for representing relationships of claim 26, wherein the matrix transformation operations further comprise:
    assigning each data element in the representation to a single node;
    defining linkages between the nodes based upon the relationships identified in the data schema;
    defining one or more matrix traversals that are associated with the relationships between the data elements and wherein the matrix traversal identifies deterministic paths between the nodes through the linkages; and
    defining the encoded data schema based upon the nodes, linkages, and matrix traversals.

28. A method for coding a document type definition into a structured document, the method comprising:
    receiving the document type definition comprising information defined by a plurality of elements and relationships coded in a pre-arranged structure;
    mapping the pre-arranged structure of the document type definition into a coded representation comprising a singular mapping of each of the plurality of elements that preserves the relationships coded in the pre-arranged structure;
    storing the coded representation in a database construct having a fixed table number that maintains the singular mapping of the plurality of elements and the associated relationships;
    populating the elements contained in the coded representation with information; and
    generating the structured document by extracting the information contained coded representation stored in the database construct and outputting the information in a markup language.

29. The method for coding a document type definition into a structured document of claim 28, the method further comprising:
    validating the document type definition to verify that the document type definition conforms to one or more logical constraints.

30. The method for coding a document type definition into a structured document of claim 29; wherein document type definitions that lack logical constraints conformity are identified as logically invalid.

31. The method for coding a document type definition into a structured document of claim 28, the method further comprising:
    validating the document type definition to verify that the document type definition conforms to one or more structural constraints.

32. The method for coding a document type definition into a structured document of claim 31; wherein document type definitions that lack structural constraint conformity are identified as structurally invalid.

33. The method for structured document generation of claim 31, wherein the markup language comprises extensible markup language.

34. The method for coding a document type definition into a structured document of claim 28, wherein the pre-arranged structure codes for one or more recursive relationships between the elements that are resolvable by mapping the pre-arranged structure into the coded structure.

35. The method for coding a document type definition into a structured document of claim 28, wherein the pre-arranged structure codes for one or more repetitive relationships between the elements that are resolvable by mapping the pre-arranged structure into the coded structure.

36. The method for coding a document type definition into a structured document of claim 28, wherein the markup language used to code the information comprises extensible markup language.

37. The method for coding a document type definition into a structured document of claim 28, wherein the structured document generated using the markup language is type validated.

38. A method for structured document generation, the method comprising:
    receiving a data structure comprising one or more data elements having identifying relationships that associate the data elements;
    transforming the data structure into a matrix representation comprising an internally recognized organization of the data structure;
    populating the data elements of the data structure transformed into the matrix representation with information; and
    accessing the information in the matrix representation to generate a structured document comprising a representation of the information in a markup language.

39. The method for structured document generation of claim 38, wherein the received data structure comprises a document type definition that describes the organization of the data elements using an elemental identification scheme recognized by the transformation module.

40. The method for structured document generation of claim 39, wherein the document type definition comprises a non-hierarchical structure that is transformed into the matrix representation to thereby preserve the non-hierarchical organization of the document type definition.

41. The method for structured document generation of claim 39, wherein the document type definition comprises a hierarchical structure that is transformed into the matrix representation to thereby preserve the hierarchical organization of the document type definition.

42. The method for structured document generation of claim 39, wherein the identifying relationships of the data structure comprise recursive relationships between the data elements.

43. The method for structured document generation of claim 42, wherein the recursive relationships between the data elements define non-deterministic relationships that are resolved through transformation into the matrix representation such that a deterministic relationship is produced between the data elements.

44. The method for structured document generation of claim 39, wherein the identifying relationships of the data structure comprise repetitive relationships between the data elements.

45. The method for structured document generation of claim 44, wherein the repetitive relationships between the data elements define non-deterministic relationships that are resolved through transformation into the matrix representation such that a deterministic relationship is produced between the data elements.

46. A system for structured document generation, the system comprising:
   an input module which receives a data structure comprising one or more data elements having identifying relationships that associate the data elements;
   a transformation module which transforms the data structure into a matrix representation wherein the matrix representation comprises an internally recognized organization of the data structure;
   a data element input module which populates the matrix representation with information; and
   a document generation module which accesses the information of the matrix representation to generate a structured document comprising a representation of the information in a markup language.

47. The system for structured document generation of claim 46, wherein the data structure received by the input module comprises a non-hierarchical data structure.

48. The system for structured document generation of claim 46, wherein the data structure received by the input module comprises a hierarchical data structure.

49. The system for structured document generation of claim 46, wherein the data structure received by the input module comprises both a non-hierarchical data structure and a hierarchical data structure.

50. The system for structured document generation of claim 46, wherein the data structure received by the input module comprises a document type definition file that describes the organization of the data elements using an elemental identification scheme recognized by the transformation module.

51. The system for structured document generation of claim 46, wherein the identifying relationships of the data structure comprise recursive relationships between the data elements.

52. The system for structured document generation of claim 51, wherein the recursive relationships between the data elements define non-deterministic relationships that are resolved through transformation into the matrix representation such that a deterministic relationship is produced between the data elements.

53. The system for structured document generation of claim 46, wherein the identifying relationships of the data structure comprise repetitive relationships between the data elements.

54. The system for structured document generation of claim 53, wherein the repetitive relationships between the data elements define non-deterministic relationships that are resolved through transformation into the matrix representation such that a deterministic relationship is produced between the data elements.

55. The system for structured document generation of claim 46, wherein the identifying relationships of the data structure comprise multiple-dependent relationships in which a child data element is directly related to a plurality of parent data elements and wherein the multiple-dependent relationships are resolved through the use of a traversal order to identify one or more deterministic relationships between the child data element and the plurality of parent data elements.

56. The system for structured document generation of claim 46, further comprising a database that stores the matrix representation.

57. The system for structured document generation of claim 56, wherein the database that stores the matrix representation comprises a fixed number of tables that do not increase as a function of the data structure complexity.

58. The system for structured document generation of claim 46, wherein the markup language comprises extensible markup language.

* * * * *